(12) United States Patent
Fan et al.

(10) Patent No.: US 12,136,961 B2
(45) Date of Patent: Nov. 5, 2024

(54) METHOD AND APPARATUS FOR DETERMINING STATUS OF ANTENNA PANEL

(71) Applicant: HUAWEI TECHNOLOGIES CO., LTD., Shenzhen (CN)

(72) Inventors: Bo Fan, Chengdu (CN); Peng Guan, Shenzhen (CN); Xiaona Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 370 days.

(21) Appl. No.: 17/531,054

(22) Filed: Nov. 19, 2021

(65) Prior Publication Data

US 2022/0077943 A1 Mar. 10, 2022

Related U.S. Application Data

(63) Continuation of application No. PCT/CN2020/092929, filed on May 28, 2020.

(30) Foreign Application Priority Data

Jun. 10, 2019 (CN) .......................... 201910497847.8

(51) Int. Cl.
*H04B 17/309* (2015.01)
*H04L 5/00* (2006.01)
(Continued)

(52) U.S. Cl.
CPC ......... *H04B 17/309* (2015.01); *H04L 5/0048* (2013.01); *H04W 24/10* (2013.01); *H04W 72/542* (2023.01)

(58) Field of Classification Search
None
See application file for complete search history.

(56) References Cited

U.S. PATENT DOCUMENTS

| 10,163,329 | B1 | 12/2018 | Jensen et al. | |
| 2018/0048375 | A1* | 2/2018 | Guo | H04B 7/024 |

(Continued)

FOREIGN PATENT DOCUMENTS

| CN | 104780030 A | 7/2015 |
| CN | 106708309 A | 5/2017 |

(Continued)

OTHER PUBLICATIONS

CATT, UE Assistance Information, 3GPP TSG-RAN WG2 Meeting 105bis, Xian, China, Apr. 8-12, 2019, R2-1903128, 2 pages.

(Continued)

*Primary Examiner* — Diane L Lo
(74) *Attorney, Agent, or Firm* — Maier & Maier, PLLC

(57) ABSTRACT

A method and an apparatus for determining a status of an antenna panel. A terminal receives configuration information including at least one downlink signal resource set. When determining that a first antenna panel corresponding to a first downlink signal resource set is turned on, the terminal measures quality of a resource in the first downlink signal resource set by using the first antenna panel, and sends first feedback information. The first feedback information may indicate the quality of the resource in the first downlink signal resource set. When the first antenna panel is turned off, the terminal skips measuring the quality of the resource in the first downlink signal resource set, and sends second feedback information. The second feedback information is used to indicate that the first antenna panel is turned off.

12 Claims, 12 Drawing Sheets

(51) Int. Cl.
*H04W 24/10* (2009.01)
*H04W 72/542* (2023.01)

(56) References Cited

U.S. PATENT DOCUMENTS

| | | | | |
|---|---|---|---|---|
| 2020/0029274 | A1* | 1/2020 | Cheng | H04W 76/28 |
| 2020/0296667 | A1* | 9/2020 | Park | H04W 52/0235 |
| 2022/0166482 | A1* | 5/2022 | Yu | H04B 7/0695 |

FOREIGN PATENT DOCUMENTS

| | | |
|---|---|---|
| CN | 108288984 A | 7/2018 |
| CN | 108768481 A | 11/2018 |
| CN | 109391305 A | 2/2019 |
| WO | 2018141204 A1 | 8/2018 |
| WO | 2019047965 A1 | 3/2019 |

OTHER PUBLICATIONS

3GPP TSG RAN Meeting 80 RP-180678,, "Support of power efficient panel switch UE feature", Qualcomm Incorporated; Jun. 4, 2018; 3 pages.

3GPP TS 38.331 V15.3.0, "3rd Generation Partnership Project; Technical Specification Group Radio Access Network; NR;Radio Resource Control (RRC) protocol specification (Release 15)", (Sep. 2018); 445 pages.

Baofen et al., "A Novel Method for Covering Specific LTE Network Blind Areas with Small Antennas", Baoji Branch of China United Network Communications Co., Ltd. Shaanxi Vocational and Technical College of Posts and Telecommunications; Jul. 8, 2015, 3 pages with Abstract.

3GPP TS 38.211 V15.0.0, "3rd Generation Partnership Project; Technical Specification Group Radio Access Network; NR; Physical channels and modulation (Release 15)", Dec. 2017; 73 pages.

Onggosanusi et al., "Modular and High-Resolution Channel State Information and Beam Management for 5G New Radio", IEEE Communications Magazine, Mar. 2018; 8 pages.

3GPP TS 38.212 V15.0.0, "3rd Generation Partnership Project;Technical Specification Group Radio Access Network; NR; Multiplexing and channel coding (Release 15)";(Dec. 2017); 82 pages.

3GPP TS 38.213 V15.0.0, "3rd Generation Partnership Project; Technical Specification Group Radio Access Network; NR; Physical layer procedures for control (Release 15)"; (Dec. 2017); 56 pages.

3GPP TS 38.214 V15.0.0, "3rd Generation Partnership Project; Technical Specification Group Radio Access Network; NR;Physical layer procedures for data (Release 15)",V15.0.0 (Dec. 2017); 71 pages.

* cited by examiner

METHOD AND APPARATUS FOR DETERMINING STATUS OF ANTENNA PANEL

CROSS-REFERENCE TO RELATED APPLICATIONS

This application is a continuation of International Application No. PCT/CN2020/092929, filed on May 28, 2020, which claims priority to Chinese Patent Application No. 201910497847.8, filed on Jun. 10, 2019. The disclosures of the aforementioned applications are hereby incorporated by reference in their entireties.

TECHNICAL FIELD

The embodiments relate to the communication field, and more specifically, to a method and an apparatus for determining a status of an antenna panel.

BACKGROUND

In a 5th generation (5G) mobile communication system, high-frequency communication may be used, that is, data is transmitted by using a super high frequency band (for example, >6 GHZ). A main problem of the high-frequency communication is that signal energy sharply decreases as a transmission distance increases, resulting in a short signal transmission distance. To overcome this problem, an analog beam technology is used in the high-frequency communication. A large quantity of antenna arrays are weighted, and energy of a signal is concentrated in a small range to form a beam-like signal (may be referred to as an "analog beam" or simply referred to as a "beam"), so as to increase the transmission distance.

A network device may generate different beams that point to different transmission directions. The network device generally uses one or more optimal beams for data transmission. In addition, a terminal may also generate different beams, and use one or more optimal beams for data transmission. A specific beam to be used for transmission is determined in a beam management process. Beam management may include downlink beam management and uplink beam management.

The downlink beam management is used to select a (network device) transmit beam for downlink data transmission. The network device configures a plurality of downlink signal resources for the terminal by using measurement configuration information, and each downlink signal resource corresponds to one beam. Each downlink signal resource further corresponds to one downlink signal. The terminal measures a downlink signal sent by each beam, to determine quality of each beam/downlink signal resource. By measuring the quality of each beam, the terminal may select one or more downlink signal resources with optimal quality, and report resource indexes and corresponding resource quality of the one or more downlink signal resources with optimal quality to the network device. The network device selects one or more downlink signal resources (beams) from the one or more downlink signal resources with optimal quality for data transmission.

A beam is generated by using an antenna panel (Panel), that is, processing (for example, phase weighting processing) is performed on all antennas on an antenna panel to form a beam signal. Each antenna panel can generate a plurality of beams with different directions, but only one beam can be generated at a time. The terminal may be equipped with a plurality of antenna panels, and may select an antenna panel with good quality for data transmission. In addition, the terminal may turn off some antenna panels, to save electric energy. However, the network device does not know which antenna panels are turned on and which antenna panels are turned off. Therefore, the network device cannot properly schedule the antenna panels for uplink data transmission, resulting in low data transmission efficiency.

SUMMARY

The embodiments provide a method and an apparatus for determining a status of an antenna panel, so that an on/off state of an antenna panel can be determined, thereby improving data transmission efficiency.

According to a first aspect, a method for determining a status of an antenna panel is provided. The method includes: receiving configuration information, where the configuration information includes at least one downlink signal resource set; and sending first feedback information when a first antenna panel corresponding to a first downlink signal resource set in the at least one downlink signal resource set is turned on, where the first feedback information is used to indicate quality of a resource in the first downlink signal resource set, and the quality of the resource in the first downlink signal resource set is obtained by measuring a downlink signal by the first antenna panel: or sending second feedback information when a first antenna panel corresponding to a first downlink signal resource set in the at least one downlink signal resource set is turned off, where the second feedback information is used to indicate that the first antenna panel is turned off.

To measure the quality of the resource in the first downlink signal resource set, a terminal needs to perform measurement by using the first antenna panel corresponding to the first downlink signal resource set. Before the measurement, the terminal needs to determine whether the first antenna panel is turned on or turned off. When the first antenna panel is turned on, the terminal may measure the quality of the resource in the first downlink signal resource set by using the first antenna panel, and send the first feedback information. The first feedback information may indicate the quality of the resource in the first downlink signal resource set. When the first antenna panel is turned off, the terminal skips measuring the quality of the resource in the first downlink signal resource set, and sends the second feedback information. The second feedback information is used to indicate that the first antenna panel is turned off. In this way, a network device in this embodiment can learn of a status of an antenna panel, and can properly schedule the antenna panel, thereby improving data transmission efficiency.

In some possible implementations, before the sending first feedback information or second feedback information, the method further includes: determining, based on a first mapping relationship and the first downlink signal resource set, the first antenna panel corresponding to the first downlink signal resource set, where the first mapping relationship is a mapping relationship between the at least one downlink signal resource set and at least one antenna panel.

The mapping relationship between the at least one downlink signal resource set and the at least one antenna panel may be that the at least one downlink signal resource set corresponds to the at least one antenna panel. One downlink signal resource set may correspond to one or more antenna panels, or one or more downlink signal resource sets correspond to one antenna panel. The terminal may store the mapping relationship between the at least one downlink signal resource set and the at least one antenna panel. In this way, after receiving the configuration information, the terminal may determine, based on the mapping relationship, an antenna panel corresponding to each of the at least one downlink signal resource set included in the configuration information, and then determine, depending on whether the antenna panel is turned on, to send the first feedback information or the second feedback information.

In some possible implementations, before the sending first feedback information or second feedback information, the method further includes: determining, based on a second mapping relationship, a third mapping relationship, and the first downlink signal resource set, the first antenna panel corresponding to the first downlink signal resource set, where the second mapping relationship is a mapping relationship between at least one report configuration and the at least one downlink signal resource set, and the third mapping relationship is a mapping relationship between at least one report configuration and at least one antenna panel.

The mapping relationship between the at least one downlink signal resource set and the at least one report configuration may be that the at least one downlink signal resource set corresponds to the at least one report configuration. The mapping relationship between the at least one report configuration and the at least one antenna panel may be that the at least one report configuration corresponds to the at least one antenna panel. One downlink signal resource set may correspond to one or more report configurations, or one or more downlink signal resource sets correspond to one report configuration. One report configuration may correspond to one or more antenna panels, or one or more report configurations correspond to one antenna panel. The terminal may determine, based on the second mapping relationship and the first downlink signal resource set, a first report configuration corresponding to the first downlink signal resource set. Alternatively, the terminal may determine, based on the third mapping relationship and the first report configuration, a first antenna panel corresponding to the first report configuration. In this way, the terminal may determine that the first downlink signal resource set corresponds to the first antenna panel.

In some possible implementations, the second feedback information includes at least one field; and when a value of the at least one field is a preset value, the at least one field indicates that the first antenna panel is turned off.

When the value of the at least one field is a special value (for example, referred to as the "preset value"), the at least one field indicates that the first antenna panel is turned off.

According to a second aspect, a method for determining a status of an antenna panel is provided. The method includes: sending configuration information, where the configuration information includes at least one downlink signal resource set: receiving first feedback information or second feedback information, where the first feedback information is used to indicate quality of a resource in a first downlink signal resource set in the at least one downlink signal resource set, the quality of the resource in the first downlink signal resource set is obtained by a terminal by measuring a downlink signal when a first antenna panel corresponding to the first downlink signal resource set is turned on, and the second feedback information is used to indicate that the first antenna panel corresponding to the first downlink signal resource set in the at least one downlink signal resource set is turned off; and determining, based on the first feedback information or the second feedback information, whether the first antenna panel is turned on or turned off.

A network device sends the configuration information including the at least one downlink signal resource set, and receives the first feedback information or the second feedback information. In this way, the network device can learn of a status of an antenna panel based on the first feedback information or the second feedback information, and properly schedule the antenna panel, thereby improving data transmission efficiency.

In some possible implementations, the at least one downlink signal resource set has a first mapping relationship with at least one antenna panel, and the first antenna panel is an antenna panel that is in the at least one antenna panel and that corresponds to the first downlink signal resource set.

The network device may determine, based on the first mapping relationship and the first feedback information, or based on the first mapping relationship and the second feedback information, the antenna panel corresponding to the first downlink signal resource set in the first feedback information or the second feedback information, and further determine an on/off state of the corresponding antenna panel. Therefore, the network device can properly schedule the antenna panel, thereby improving the data transmission efficiency.

In some possible implementations, at least one report configuration has a second mapping relationship with the at least one downlink signal resource set, the at least one report configuration has a third mapping relationship with at least one antenna panel, the first antenna panel is an antenna panel that is in the at least one antenna panel and that corresponds to a first report configuration, and the first report configuration is a report configuration that is in the at least one report configuration and that corresponds to the first downlink signal resource set.

The network device may determine, based on the second mapping relationship and the first downlink signal resource set, the first report configuration corresponding to the first downlink signal resource set. Then, the network device determines, based on the third mapping relationship and the first report configuration, the first antenna panel corresponding to the first report configuration. In this way, the network device can determine, based on feedback information of the first downlink signal resource set, an on/off state of the first antenna panel corresponding to the first downlink signal resource set, and further properly schedule the antenna panel, thereby improving the data transmission efficiency.

In some possible implementations, the second feedback information includes at least one field; and when a value of the at least one field is a preset value, the value of the at least one field indicates that the first antenna panel is turned off.

After receiving the second feedback information, the network device obtains, through parsing, that the value of the at least one field in the second feedback information is a special value. In this case, the network device determines that the first antenna panel is turned off, and can properly schedule the antenna panel, thereby improving the data transmission efficiency.

According to a third aspect, a method for determining a status of an antenna panel is provided. The method includes: receiving first configuration information, where the first configuration information includes at least one uplink signal resource set; and when a first antenna panel corresponding to a first uplink signal resource set in the at least one uplink signal resource set is turned on, sending a first reference signal by using the first antenna panel, where the first reference signal is a reference signal corresponding to a resource in the first uplink signal resource set: or when a first antenna panel corresponding to a first uplink signal resource set in the at least one uplink signal resource set is turned off, skipping sending a first reference signal, where the first reference signal is a reference signal corresponding to a resource in the first uplink signal resource set.

An uplink signal resource set has a correspondence with an antenna panel, and a resource in the uplink signal resource set has a correspondence with a reference signal. The terminal determines whether the first antenna panel corresponding to the first uplink signal resource set is turned on, and if the first antenna panel is turned on, sends the first reference signal by using the first antenna panel. The first uplink signal resource set may be any one of the at least one uplink signal resource set. That is, the terminal sends, by using an antenna panel corresponding to each uplink signal resource set, a reference signal corresponding to the uplink signal resource set. If the first antenna panel corresponding to the first uplink signal resource set is turned off, the terminal skips sending the reference signal corresponding to the resource in the first uplink signal resource set. In this way, the network device can learn of a status of an antenna panel, and can properly schedule the antenna panel, thereby improving data transmission efficiency.

In some possible implementations, the first reference signal is used to measure quality of a first resource in the first uplink signal resource set.

The terminal may reuse a reference signal (for example, the first reference signal) used to measure resource quality in a conventional solution. In this way, the terminal does not need to specially send the first reference signal to help the network device determine, based on the first reference signal, whether the antenna panel is turned on or turned off, thereby reducing signaling and resource overheads.

In some possible implementations, the at least one uplink signal resource set has a mapping relationship with at least one antenna panel, and the first antenna panel is an antenna panel that is in the at least one antenna panel and that corresponds to the first uplink signal resource set.

The terminal may determine, based on the mapping relationship, an antenna panel corresponding to each uplink signal resource set.

In some possible implementations, the method further includes: receiving second configuration information; and adjusting a configuration parameter of the first antenna panel based on the second configuration information.

The terminal may further receive the second configuration information that is sent by the network device when the network device learns that the first antenna panel is turned off, and adjust the first antenna panel based on the second configuration information, for example, adjust the first antenna panel to a turned-on state. In this case, the network device can schedule the first antenna panel to perform data transmission, thereby improving the data transmission efficiency.

In some possible implementations, the second configuration information includes a reconfigured configuration parameter, and the configuration parameter includes at least one of a measurement report related configuration, a measurement resource related configuration, a transmission configuration indicator TCI status, a spatial relation, an uplink scheduling request SR resource, and a physical uplink control channel resource.

According to a fourth aspect, a method for determining a status of an antenna panel is provided. The method includes: sending first configuration information, where the first configuration information includes at least one uplink signal resource set: detecting a first reference signal corresponding to a first resource in a first uplink signal resource set in the at least one uplink signal resource set; and determining, based on a receiving status of the first reference signal, whether a first antenna panel corresponding to the first uplink signal resource set is turned on or turned off.

A network device may separately determine, based on a receiving status of a reference signal corresponding to a resource in an uplink signal resource set, a status of an antenna panel corresponding to each uplink signal resource set. In other words, the network device in this embodiment can learn of a status of an antenna panel, and can properly schedule the antenna panel, thereby improving data transmission efficiency.

In some possible implementations, the first reference signal is used to measure quality of a first resource in the first uplink signal resource set.

The network device detects the first reference signal used to measure the quality of the first resource, determines, based on the first reference signal, whether the antenna panel is turned on or turned off. This avoids specially monitoring the first reference signal, and reduces signaling and resource overheads.

In some possible implementations, the at least one uplink signal resource set has a mapping relationship with at least one antenna panel, and the first antenna panel is an antenna panel that is in the at least one antenna panel and that corresponds to the first uplink signal resource set.

The network device may determine, based on the mapping relationship, an antenna panel corresponding to each uplink signal resource set. Further, it can be determined, based on an antenna panel that detects an uplink signal corresponding to a resource in each uplink signal resource set, whether the antenna panel is turned on or turned off, thereby improving the data transmission efficiency.

In some possible implementations, the determining, based on a receiving status of the first reference signal, whether a first antenna panel corresponding to the first uplink signal resource set is turned on includes: when the first reference signal is not received, determining that the first antenna panel is turned off: when quality of the received first reference signal is less than or equal to a preset quality threshold, determining that the first antenna panel is turned off: or when quality of the received first reference signal is greater than a preset quality threshold, determining that the first antenna panel is turned on.

The network device can determine, based on a specific receiving status of the first reference signal, whether the first antenna panel is turned on or turned off. In this case, the network device can more properly schedule the first antenna panel, thereby further improving the data transmission efficiency.

In some possible implementations, when the first antenna panel is turned off, the method further includes: sending second configuration information to a terminal, where the second configuration information is used to adjust a configuration parameter of the first antenna panel.

When the network device learns that the first antenna panel is turned off, the network device may send the second configuration information to adjust the first antenna panel, for example, adjust the first antenna panel to a turned-on state. In this case, the network device can schedule the first antenna panel to perform data transmission, thereby improving the data transmission efficiency.

In some possible implementations, the second configuration information includes a reconfigured configuration parameter, and the configuration parameter includes at least one of a measurement report related configuration, a measurement resource related configuration, a transmission configuration indicator TCI status, a spatial relation, an uplink scheduling request SR resource, and a physical uplink control channel resource.

According to a fifth aspect, an apparatus for determining a status of an antenna panel is provided. The apparatus may be a terminal, or may be a chip in the terminal. The apparatus has a function of implementing the first aspect and various possible implementations thereof. The function may be implemented by using hardware, or may be implemented by hardware by executing corresponding software. The hardware or the software includes one or more modules corresponding to the function.

In a possible implementation, the apparatus includes a transceiver module and a processing module. The transceiver module may be, for example, at least one of a transceiver, a receiver, or a transmitter. The transceiver module may include a radio frequency circuit or an antenna. The processing module may be a processor. Optionally, the apparatus further includes a storage module, and the storage module may be, for example, a memory. When the apparatus includes the storage module, the storage module is configured to store instructions. The processing module is connected to the storage module, and the processing module may execute the instructions stored in the storage module or instructions from another module, to enable the apparatus to perform the communication method according to the first aspect and various possible implementations thereof. In this implementation, the apparatus may be a terminal.

In another possible implementation, when the apparatus is a chip, the chip includes a transceiver module and a processing module. The transceiver module may be, for example, an input/output interface, a pin, or a circuit on the chip. The processing module may be, for example, a processor. The processing module may execute instructions, to enable the chip in the terminal to perform the communication method according to any one of the first aspect and the possible implementations thereof. Optionally, the processing module may execute instructions in a storage module, and the storage module may be a storage module in the chip, for example, a register or a buffer. The storage module may alternatively be located inside a communication device but outside the chip, for example, a read-only memory (ROM) or another type of static storage device that can store static information and instructions, or a random access memory (RAM).

The processor mentioned anywhere above may be a general-purpose central processing unit (CPU), a microprocessor, an application-specific integrated circuit (ASIC), or one or more integrated circuits configured to control program execution of the communication method according to the foregoing aspects.

According to a sixth aspect, an apparatus for determining a status of an antenna panel is provided. The apparatus may be a network device, or may be a chip in the network device. The apparatus has a function of implementing the second aspect and various possible implementations thereof. The function may be implemented by using hardware, or may be implemented by hardware by executing corresponding software. The hardware or the software includes one or more modules corresponding to the function.

In a possible implementation, the apparatus includes a transceiver module and a processing module. The transceiver module may be, for example, at least one of a transceiver, a receiver, or a transmitter. The transceiver module may include a radio frequency circuit or an antenna. The processing module may be a processor.

Optionally, the apparatus further includes a storage module, and the storage module may be, for example, a memory. When the apparatus includes the storage module, the storage module is configured to store instructions. The processing module is connected to the storage module, and the processing module may execute the instructions stored in the storage module or instructions from another module, to enable the apparatus to perform the method according to any one of the second aspect or the possible implementations thereof.

In another possible implementation, when the apparatus is a chip, the chip includes a transceiver module and a processing module. The transceiver module may be, for example, an input/output interface, a pin, or a circuit on the chip. The processing module may be, for example, a processor. The processing module may execute instructions, to enable the chip in the network device to perform the communication method according to any one of the second aspect and the possible implementations thereof.

Optionally, the processing module may execute instructions in a storage module, and the storage module may be a storage module in the chip, for example, a register or a buffer. The storage module may alternatively be located inside a communication device but located outside a chip, for example, a ROM or another type of static storage device that can store static information and instructions, or a RAM.

The processor mentioned anywhere above may be a CPU, a microprocessor, an application-specific integrated circuit ASIC, or one or more integrated circuits configured to control program execution of the communication methods in the foregoing aspects.

According to a seventh aspect, an apparatus for determining a status of an antenna panel is provided. The apparatus may be a terminal, or may be a chip in the terminal. The apparatus has a function of implementing the third aspect and various possible implementations thereof. The function may be implemented by using hardware, or may be implemented by hardware by executing corresponding software. The hardware or the software includes one or more modules corresponding to the function.

In a possible implementation, the apparatus includes a transceiver module and a processing module. The transceiver module may be, for example, at least one of a transceiver, a receiver, or a transmitter. The transceiver module may include a radio frequency circuit or an antenna. The processing module may be a processor. Optionally, the apparatus further includes a storage module, and the storage module may be, for example, a memory. When the apparatus includes the storage module, the storage module is configured to store instructions. The processing module is connected to the storage module, and the processing module may execute the instructions stored in the storage module or instructions from another module, to enable the apparatus to perform the communication method according to the third aspect and various possible implementations thereof. In this implementation, the apparatus may be a terminal.

In another possible implementation, when the apparatus is a chip, the chip includes a transceiver module and a processing module. The transceiver module may be, for example, an input/output interface, a pin, or a circuit on the chip. The processing module may be, for example, a processor. The processing module may execute instructions, to enable the chip in the terminal to perform the communication method according to any one of the third aspect and the possible implementations thereof. Optionally, the processing module may execute instructions in a storage module, and the storage module may be a storage module in the chip, for example, a register or a buffer. The storage module may alternatively be located inside a communication device but located outside a chip, for example, a ROM or another type of static storage device that can store static information and instructions, or a RAM.

The processor mentioned anywhere above may be a CPU, a microprocessor, an ASIC, or one or more integrated circuits configured to control program execution of the communication methods in the foregoing aspects.

According to an eighth aspect, an apparatus for determining a status of an antenna panel is provided. The apparatus may be a network device, or may be a chip in the network device. The apparatus has a function of implementing the fourth aspect and various possible implementations thereof. The function may be implemented by using hardware, or may be implemented by hardware by executing corresponding software. The hardware or the software includes one or more modules corresponding to the function.

In a possible implementation, the apparatus includes a transceiver module and a processing module. The transceiver module may be, for example, at least one of a transceiver, a receiver, or a transmitter. The transceiver module may include a radio frequency circuit or an antenna. The processing module may be a processor.

Optionally, the apparatus further includes a storage module, and the storage module may be, for example, a memory. When the apparatus includes the storage module, the storage module is configured to store instructions. The processing module is connected to the storage module, and the processing module may execute the instructions stored in the storage module or instructions from another module, to enable the apparatus to perform the method according to any one of the fourth aspect or the possible implementations thereof.

In another possible implementation, when the apparatus is a chip, the chip includes a transceiver module and a processing module. The transceiver module may be, for example, an input/output interface, a pin, or a circuit on the chip. The processing module may be, for example, a processor. The processing module may execute instructions, to enable the chip in the network device to perform the communication method according to any one of the fourth aspect and the possible implementations thereof.

Optionally, the processing module may execute instructions in a storage module, and the storage module may be a storage module in the chip, for example, a register or a buffer. The storage module may alternatively be located inside a communication device but located outside a chip, for example, a ROM or another type of static storage device that can store static information and instructions, or a RAM.

The processor mentioned anywhere above may be a CPU, a microprocessor, an ASIC, or one or more integrated circuits configured to control program execution of the communication methods in the foregoing aspects.

According to a ninth aspect, a computer storage medium is provided. The computer storage medium stores program code, and the program code is used to indicate instructions for performing the method according to any one of the first aspect and the possible implementations thereof.

According to a tenth aspect, a computer storage medium is provided. The computer storage medium stores program code, and the program code is used to indicate instructions for performing the method according to any one of the second aspect and the possible implementations thereof.

According to an eleventh aspect, a computer storage medium is provided. The computer storage medium stores program code, and the program code is used to indicate instructions for performing the method according to any one of the third aspect and the possible implementations thereof.

According to a twelfth aspect, a computer storage medium is provided. The computer storage medium stores program code, and the program code is used to indicate instructions for performing the method according to any one of the fourth aspect and the possible implementations thereof.

According to a thirteenth aspect, a computer program product including instructions is provided. When the computer program product runs on a computer, the computer is enabled to perform the method according to any one of the first aspect or the possible implementations thereof.

According to a fourteenth aspect, a computer program product including instructions is provided. When the computer program product runs on a computer, the computer is enabled to perform the method according to any one of the second aspect or the possible implementations thereof.

According to a fifteenth aspect, a computer program product including instructions is provided. When the computer program product runs on a computer, the computer is enabled to perform the method according to any one of the third aspect or the possible implementations thereof.

According to a sixteenth aspect, a computer program product including instructions is provided. When the computer program product runs on a computer, the computer is enabled to perform the method according to any one of the fourth aspect or the possible implementations thereof.

According to a seventeenth aspect, a communication system is provided. The communication system includes the apparatus according to the fifth aspect and the apparatus according to the sixth aspect.

According to an eighteenth aspect, a communication system is provided. The communication system includes the apparatus according to the seventh aspect and the apparatus according to the eighth aspect.

Based on the foregoing solutions, a terminal receives configuration information including at least one downlink signal resource set. When determining that a first antenna panel corresponding to a first downlink signal resource set is turned on, the terminal measures quality of a resource in the first downlink signal resource set by using the first antenna panel, and sends first feedback information. The first feedback information may indicate the quality of the resource in the first downlink signal resource set. When the first antenna panel is turned off, the terminal skips measuring the quality of the resource in the first downlink signal resource set, and sends second feedback information. The second feedback information is used to indicate that the first antenna panel is turned off. In this way, a network device in embodiments can learn of a status of an antenna panel, and can properly schedule the antenna panel, thereby improving data transmission efficiency.

DETAILED DESCRIPTION OF THE EMBODIMENTS

Figure 1:
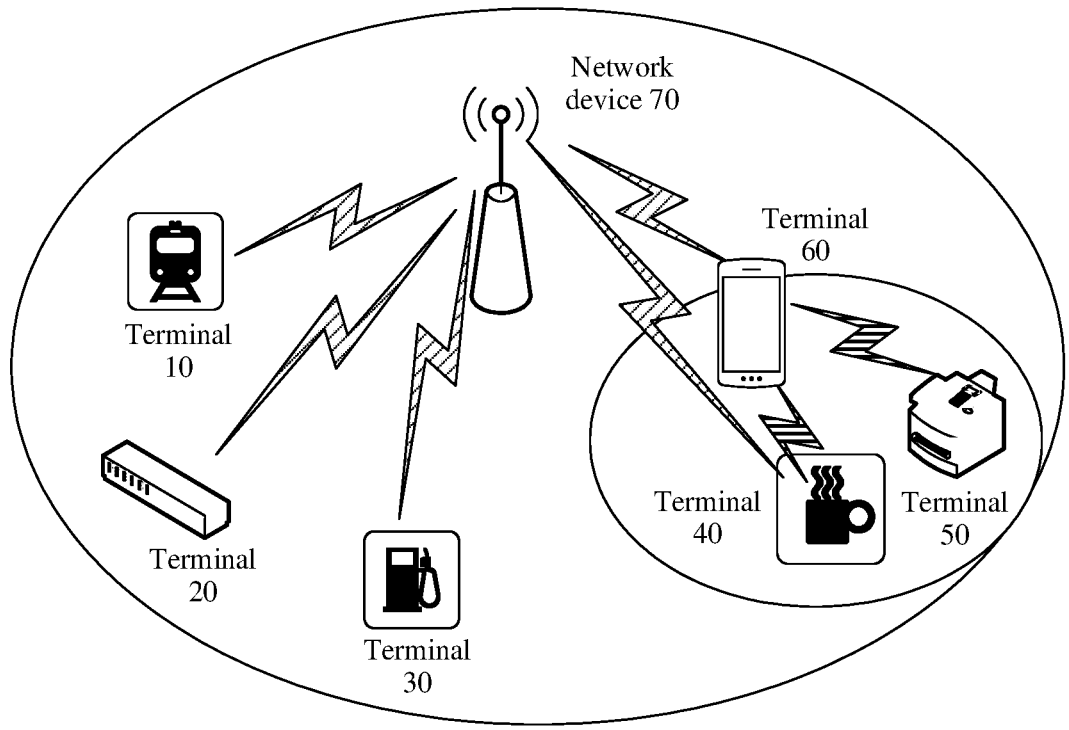
FIG. 1 is a schematic diagram of a communication system according to the embodiments.

The following describes the solutions in the embodiments with reference to the accompanying drawings.

The following describes terms used in the embodiments.

1. Beam:

The beam is a communication resource, and different beams may be considered as different communication resources. The different beams may be used to send same information, or may be used to send different information. The beam may correspond to at least one of a time domain resource, a space resource, and a frequency domain resource.

Optionally, a plurality of beams having a same or similar communication feature may be considered as one beam, and one beam may include one or more antenna ports, configured to transmit a data channel, a control channel, a sounding signal, and the like. For example, a transmit beam may refer to signal strength distribution formed in different directions in space after a signal is transmitted through an antenna, and a receive beam may refer to signal strength distribution in different directions in space of a radio signal received from an antenna.

For example, the beam may be a wide beam, may be a narrow beam, or may be a beam of another type. A technology for forming a beam may be a beamforming technology or another technical manner. This is not limited in the embodiments. With the use of the beamforming technology, a higher antenna array gain may be achieved by sending or receiving a signal in a specific direction in space. In addition, beams may be classified into a transmit beam and a receive beam of a network device and a transmit beam and a receive beam of a terminal. The transmit beam of the network device is used to describe beamforming information on a transmit side of the network device, and the receive beam of the network device is used to describe beamforming information on a receive side of the network device. The transmit beam of the terminal is used to describe beamforming information on a transmit side of the terminal, and the receive beam of the terminal is used to describe beamforming information on a receive side.

Further, the beamforming technology includes a digital beamforming technology, an analog beamforming technology, and a hybrid digital analog beamforming technology. The analog beamforming technology may be implemented by using a radio frequency. For example, a phase of a radio frequency chain (RF chain) is adjusted by using a phase shifter, to control a change of an analog beam direction. Therefore, one RF chain can only generate one analog beam at a same moment. In addition, for communication based on the analog beam, a beam at a transmit end and a beam at a receive end need to be aligned. Otherwise, a signal cannot be normally transmitted.

It should be understood that one or more antenna ports forming one beam may also be considered as one antenna port set.

It should be further understood that the beam may be further represented by using a spatial filter or a spatial transmission filter. In other words, the beam may also be referred to as the "spatial filter". A transmit beam is referred to as a "spatial transmit filter", and a receive beam is referred to as a "spatial receive filter" or a "downlink spatial filter". The receive beam of the network device or the transmit beam of the terminal device may also be referred to as an "uplink spatial filter", and the transmit beam of the network device or the receive beam of the terminal device may also be referred to as a "downlink spatial filter". Selection of N optimal beam pair links (BPLs) (one BPL includes one transmit beam of the network device and one receive beam of the terminal, or one BPL includes one transmit beam of the terminal and one receive beam of the network device) is used by the terminal to select the transmit beam of the network device and/or the receive beam of the terminal based on beam sweeping performed by the network device, and used by the network device to select the transmit beam of the terminal and/or the receive beam of the network device based on beam sweeping performed by the terminal.

For example, the transmit beam may be a base station transmit beam or a terminal transmit beam. When the transmit beam is the base station transmit beam, a base station sends reference signals to user equipment (UE) through different transmit beams, and the UE receives, through a same receive beam, the reference signals sent by the base station through the different transmit beams, determines an optimal base station transmit beam based on the received signals, and then feeds back the optimal base station transmit beam to the base station, to help the base station update the transmit beam. When the transmit beam is the terminal transmit beam, the UE sends reference signals to the base station through different transmit beams, and the base station receives, through a same receive beam, the reference signals sent by the UE through the different transmit beams, determines an optimal UE transmit beam based on the received signals, and then feeds back the optimal UE transmit beam to the UE, to help the UE update the transmit beam. The process of sending the reference signals through different transmit beams may be referred to as beam sweeping, and the process of determining the optimal transmit beam based on the received signals may be referred to as beam matching.

The receive beam may be a base station receive beam or a terminal receive beam. When the receive beam is the base station receive beam, the UE sends reference signals to the base station through a same transmit beam, and the base station receives, through different receive beams, the reference signals sent by the UE, and then determines an optimal base station receive beam based on the received signals, to update the base station receive beam. When the receive beam is the UE receive beam, the base station sends reference signals to the UE through a same transmit beam, and the UE receives, through different receive beams, the reference signals sent by the base station, and then determines an optimal UE receive beam based on the received signals, to update the UE receive beam.

It should be noted that for downlink beam training, the network device configures a type of a reference signal resource set for beam training. When a repetition parameter configured for the reference signal resource set is "on", the terminal assumes that reference signals in the reference signal resource set are transmitted by using a same downlink spatial filter, that is, are transmitted by using a same transmit beam. In this case, usually, the terminal receives the reference signals in the reference signal resource set through different receive beams, and obtains an optimal receive beam of the terminal through training. Optionally, the terminal device may report N reference signals with best channel quality measured by the UE. When the repetition parameter configured for the reference signal resource set is "off", the terminal does not assume that the reference signals in the reference signal resource set are transmitted by using the same downlink spatial filter, that is, does not assume that the network device transmits the reference signals by using the same transmit beam. In this case, the terminal selects N optimal beams from the resource set by measuring channel quality of the reference signals in the set, and feeds back the N optimal beams to the network device. Usually, in this case, the terminal uses a same receive beam in this process.

2. Beamforming Technology:

With the use of the beamforming technology, a higher antenna array gain may be achieved by sending or receiving a signal in a specific direction in space. Analog beamforming may be implemented by using a radio frequency. For example, an RF chain adjusts a phase by using a phase shifter to control a change in an analog beam direction. Therefore, one RF chain can only generate one analog beam at a same moment.

3. Beam Management Resource:

The beam management resource is a resource used for beam management and may also be represented as a resource used to calculate and measure beam quality. The beam quality includes layer 1 reference signal received power (L1-RSRP), layer 1 reference signal received quality (L1-RSRQ), and the like. For example, the beam management resource may include a synchronization signal, a broadcast channel, a downlink channel measurement reference signal, a tracking signal, a downlink control channel demodulation reference signal, a downlink shared channel demodulation reference signal, an uplink sounding reference signal, an uplink random access signal, and the like.

4. Resource

During beam measurement, a beam corresponding to a resource may be uniquely identified through an index of the resource. The resource may be an uplink signal resource, or may be a downlink signal resource. An uplink signal includes, but is not limited to, an uplink random access sequence, an uplink sounding reference signal, an uplink control channel demodulation reference signal (DMRS), an uplink data channel demodulation reference signal, an uplink phase noise tracking signal (PTRS), and a sounding reference signal (SRS). A downlink signal includes, but is not limited to, a channel state information reference signal (CSI-RS), a cell specific reference signal (CS-RS), a UE specific reference signal (US-RS), a downlink control channel demodulation reference signal (DMRS), a downlink data channel demodulation reference signal, a downlink phase noise tracking signal, and a synchronization signal/physical broadcast channel block (SS/PBCH block). The SS/PBCH block may be referred to as a synchronization signal block (SSB).

The resource is configured by using radio resource control (RRC) signaling. In a configuration structure, one resource is one data structure, including a related parameter of an uplink/downlink signal corresponding to the resource, for example, a type of the uplink/downlink signal, a resource element that carries the uplink/downlink signal, transmit time and a transmit periodicity of the uplink/downlink signal, and a quantity of ports used to send the uplink/downlink signal. Each resource of the uplink/downlink signal has a unique index, to identify a resource of the downlink signal. It may be understood that the index of the resource may also be referred to as an identifier of the resource. This is not limited in the embodiments.

5. Beam Indication Information:

The beam indication information is used to indicate a beam used for transmission, including a transmit beam and/or a receive beam. The beam indication information includes at least one of a beam number, a beam management resource number, a resource number of an uplink signal, a resource number of a downlink signal, an absolute index of a beam, a relative index of a beam, a logical index of a beam, an index of an antenna port corresponding to a beam, an index of an antenna port group corresponding to a beam, an index of a downlink signal corresponding to a beam, a time index of a downlink synchronization signal block corresponding to a beam, beam pair link (BPL) information, a transmit parameter (Tx parameter) corresponding to a beam, a receive parameter (Rx parameter) corresponding to a beam, a transmit weight corresponding to a beam, a weight matrix corresponding to a beam, a weight vector corresponding to a beam, a receive weight corresponding to a beam, an index of a transmit weight corresponding to a beam, an index of a weight matrix corresponding to a beam, an index of a weight vector corresponding to a beam, an index of a receive weight corresponding to a beam, a receive codebook corresponding to a beam, a transmit codebook corresponding to a beam, an index of a receive codebook corresponding to a beam, or an index of a transmit codebook corresponding to a beam. Optionally, the network device may further assign a QCL identifier to beams having a quasi-co-location (QCL) relationship in beams associated with a frequency resource group. The beam may also be referred to as a spatial transmission filter, the transmit beam may also be referred to as a spatial transmit filter, and the receive beam may also be referred to as a spatial receive filter. The beam indication information may be further represented as a transmission configuration index (TCI). The TCI may include a plurality of parameters such as a cell number, a bandwidth part number, a reference signal identifier, a synchronization signal block identifier, and a QCL type. Quasi-co-location (QCL): a co-location relationship is used to indicate that a plurality of resources have one or more same or similar communication features. A same or similar communication configuration may be used for the plurality of resources having the co-location relationship. For example, if two antenna ports have the co-location relationship, a large-scale channel property in which one port transmits a symbol may be inferred from a large-scale channel property in which the other port transmits a symbol. The large-scale property may include delay spread, an average delay, Doppler spread, a Doppler frequency shift, an average gain, a receive parameter, a receive beam number of the terminal, transmit/receive channel correlation, an angle of arrival, spatial correlation of a receiver antenna, a dominant angle of arrival (AoA), an average angle of arrival, AoA spread, and the like. Spatial quasi-co-location (spatial QCL) can be considered as a type of QCL. The spatial may be understood from two perspectives: from a transmit end or from a receive end. From the perspective of the transmit end, if two antenna ports are spatially quasi-co-located, beam directions corresponding to the two antenna ports are spatially consistent, that is, spatial filters are the same. From the perspective of the receive end, if two antenna ports are spatially quasi-co-located, it means that the receive end can receive, in a same beam direction, signals sent by the two antenna ports.

6. QCL:

A co-location relationship is used to indicate that a plurality of resources have one or more same or similar communication features. A same or similar communication configuration may be used for the plurality of resources having the co-location relationship. For example, if two antenna ports have the co-location relationship, a large-scale channel property in which one port transmits a symbol may be inferred from a large-scale channel property in which the other port transmits a symbol. The large-scale property may include delay spread, an average delay, Doppler spread, a Doppler frequency shift, an average gain, a receive parameter, a receive beam number of the terminal, transmit/receive channel correlation, an angle of arrival, spatial correlation of a receiver antenna, an AoA, an average angle of arrival, AoA spread, and the like.

7. Beam Management

Beam management is a beam measurement procedure in R15 protocol, and may be classified into downlink beam management and uplink beam management.

The solutions of the embodiments may be applied to various communication systems, for example, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunications system (UMTS), a worldwide interoperability for microwave access (WiMAX) communication system, a future 5th generation (5G) system, or new radio (NR).

The terminal in the embodiments may be user equipment, an access terminal, a subscriber unit, a subscriber station, a mobile station, a remote station, a remote terminal, a mobile device, a user terminal, a terminal, a wireless communication device, a user agent, or a user apparatus. Alternatively, the terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a future 5G network, a terminal in a future evolved public land mobile network (PLMN), or the like. This is not limited in the embodiments.

The network device in the embodiments may be a device configured to communicate with the terminal. The network device may be a base transceiver station (BTS) in a global system for mobile communications (GSM) system or code division multiple access (CDMA), may be a NodeB (NB) in a wideband code division multiple access (WCDMA) system, may be an evolved NodeB (eNodeB) in an LTE system, or may be a radio controller in a cloud radio access network (CRAN) scenario. Alternatively, the network device may be a relay station, an access point, a vehicle-mounted device, a wearable device, a network device in a 5G network or a network device in a future evolved PLMN network, or one or a group of antenna panels (including a plurality of antenna panels) of a base station in a 5G system. Alternatively, the network device may be a network node that constitutes a gNB or a transmission point, for example, a baseband unit (BBU) or a distributed unit (DU). This is not limited in the embodiments.

In some deployments, the gNB may include a centralized unit (CU) and the DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be a network device in an access network (RAN), or the CU may be a network device in a core network (CN). This is not limited in the embodiments.

In the embodiments, the terminal or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments is not limited in the embodiments, provided that a program that records code of the method provided in the embodiments can be run to perform communication based on the method provided in the embodiments. For example, the execution body of the method provided in the embodiments may be the terminal or the network device, or may be a function module that can invoke and execute the program in the terminal or the network device.

In addition, aspects or features of the embodiments may be implemented as a method, an apparatus, or a product that uses standard programming and/or engineering technologies. The term "product" covers a computer program that can be accessed from any computer-readable component, carrier, or medium. For example, a computer-readable medium may include, but is not limited to: a magnetic storage device (for example, a hard disk, a floppy disk or a magnetic tape), an optical disc (for example, a compact disc (CD), a digital versatile disc (DVD, or the like)), a smart card, and a flash memory component (for example, erasable programmable read-only memory (EPROM), a card, a stick, or a key drive). In addition, various storage media described may represent one or more devices and/or other machine-readable media that are configured to store information. The term "machine-readable media" may include, but is not limited to, radio channels and various other media that can store, include, and/or carry instructions and/or data.

FIG. 1 is a schematic diagram of a communication system according to the embodiments. The communication system in FIG. 1 may include at least one terminal (for example, a terminal 10, a terminal 20, a terminal 30, a terminal 40, a terminal 50, and a terminal 60) and a network device 70. The network device 70 is configured to provide a communication service for the terminal and access a core network. The terminal may access a network by searching for a synchronization signal, a broadcast signal, or the like sent by the network device 70, to communicate with the network. The terminal 10, the terminal 20, the terminal 30, the terminal 40, and the terminal 60 in FIG. 1 may perform uplink and downlink transmission with the network device 70. For example, the network device 70 may send downlink signals to the terminal 10, the terminal 20, the terminal 30, the terminal 40, and the terminal 60, or may receive uplink signals sent by the terminal 10, the terminal 20, the terminal 30, the terminal 40, and the terminal 60.

In addition, the terminal 40, the terminal 50, and the terminal 60 may also be considered as a communication system. The terminal 60 may send downlink signals to the terminal 40 and the terminal 50, or may receive uplink signals sent by the terminal 40 and the terminal 50.

It should be noted that the embodiments may be applied to a communication system including one or more network devices, or may be applied to a communication system including one or more terminals. This is not limited in the embodiments.

It should be understood that the communication system may include one or more network devices. One network device may send data or control signaling to one or more terminals. Alternatively, a plurality of network devices may simultaneously send data or control signaling to one or more terminals.

Figure 2:
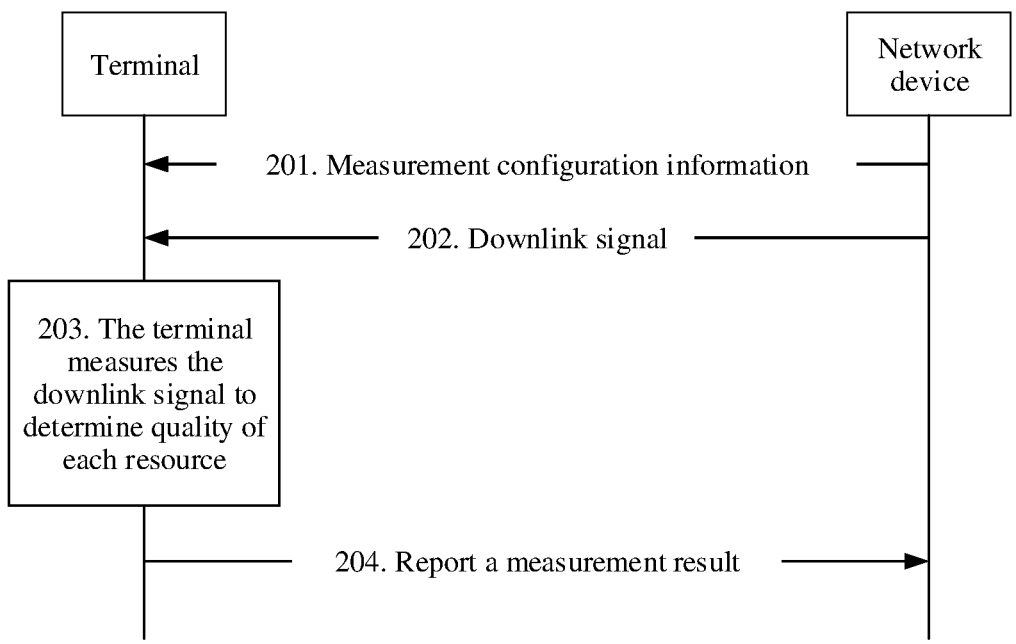
FIG. 2 is a schematic flowchart of a downlink beam management method in a conventional solution.

FIG. 2 is a schematic flowchart of a downlink beam management method in a conventional solution.

201. A network device sends measurement configuration information to a terminal.

The measurement configuration information may be carried in RRC signaling. The measurement configuration information mainly includes resource configuration information and report configuration information. The resource configuration information is related information used to measure a resource, and may be configured in a protocol by using a three-level structure (that is, a resource configuration (resourceConfig/resourceSetting), a resource set (resourceSet), and a resource). The network device may configure one or more resource configurations for the terminal. Each resource configuration includes one or more resource sets, and each resource set may include one or more resources. Each resource configuration, each resource set, or each resource includes an index that identifies the resource configuration, the resource set, or the resource. In addition, each resource configuration, each resource set, or each resource may further include some other parameters, for example, a periodicity of a resource and a signal type corresponding to a resource. The report configuration information is information related to reporting a measurement result, and is configured in a protocol by using a report configuration (for example, the report configuration is ReportConfig). The network device may configure one or more report configurations for the terminal, and each report configuration includes report-related information such as a report indicator, report time, a report periodicity, and a report format. In addition, the report configuration further includes an index of a resource configuration, used to indicate a measurement configuration by using which the report result is obtained.

A specific format of the resource configuration is as follows:

CSI-ResourceConfig::=SEQUENCE {
<Index of a resource configuration>
csi-ResourceConfigId CSI-ResourceConfigId,
<The resource configuration includes a resource set list, which may be an nzp-CSI-RS-SSB resource set list, or a csi-IM resource set list.>
csi-RS-ResourceSetList CHOICE {
<The nzp-CSI-RS-SSB resource set list includes a plurality of nzp-CSI-RS resource sets or a plurality of csi-SSB resource sets, or includes the plurality of nzp-CSI-RS resource sets and the plurality of csi-SSB resource sets.>
nzp-CSI-RS-SSB-ResourceSetList SEQUENCE {
nzp-CSI-RS-ResourceSetList SEQUENCE (SIZE (1 . . . maxNrofNZP-CSI-RS-ResourceSetsPerConfig)) OF
NZP-CSI-RS-ResourceSetId
csi-SSB-ResourceSetList SEQUENCE (SIZE (1 . . . maxNrofCSI-SSB-ResourceSetsPerConfig)) OF CSI-SSB-ResourceSetId
<The csi-IM resource set list includes a plurality of csi-IM resource sets.>
csi-IM-ResourceSetList SEQUENCE (SIZE (1 . . . maxNrofCSI-IM-ResourceSetsPerConfig)) OF CSI-IM-ResourceSetId
<Frequency of a cell is divided into a plurality of bandwidth parts, and bwp-id is used to indicate an identifier of a bandwidth part.>
bwp-Id BWP-Id,
<Time domain sending characteristic that is of the resource and that is in the resource configuration, that is, whether the resource is periodically sent, semi-persistently sent, or aperiodically sent>
resource Type ENUMERATED {aperiodic, semiPersistent, periodic}, . . .
<The resource set includes one or more resources. The nzp-CSI-RS resource set includes one or more nzp-CSI-RS resources, the csi-SSB resource set includes one or more SSB resources, and the csi-IM resource set includes one or more csi-IM resources. There are many types of resource sets, and details are not provided herein.>}
A specific format of the report configuration is as follows:
CSI-ReportConfig::=SEQUENCE {
  <Index of the report configuration>
  reportConfigId CSI-ReportConfigId,
  <Identifier of a resource configuration used to measure channel information>
  resourcesForChannelMeasurement CSI-ResourceConfigId,
  <Identifier of a resource configuration used to measure interference information, where resource types included in the resource configuration are all csi-IM>
  csi-IM-ResourcesForInterference CSI-ResourceConfigId
  <Identifier of a resource configuration used to measure interference information, where resource types included in the resource configuration are all nzp-CSI-RS>
  nzp-CSI-RS-ResourcesForInterference CSI-ResourceConfigId
  <Reported parameters, such as RSRP and CQI>
  reportQuantity CHOICE { . . .
  <Group-based report criterion, which may be configured as enabled or disabled>
  groupBasedBeamReporting CHOICE {
    <When this criterion is configured as enabled, no further details need to be configured. The UE reports two resource identifiers CRIs or SSBRIs that can be received simultaneously.>
    enabled NULL,
    <If this criterion is configured as disabled, a specific quantity of to-be-reported beams needs to be further configured. The quantity may be configured to 1 to 4. For example, if the quantity is configured to 4, the UE reports four resource identifiers. The four resource identifiers do not need to be received simultaneously.>
    disabled SEQUENCE {
      nrofReportedRS ENUMERATED {n1, n2, n3, n4}
    },
  }
}

202. The network device sends a downlink signal on a resource element corresponding to a resource configured in the resource configuration information in the measurement configuration information.

203. The terminal measures the downlink signal to determine quality of each resource (that is, quality of a beam corresponding to the resource).

204. The terminal sends a beam measurement report to the network device.

The beam measurement report includes indexes of one or more resources, resource quality, and the like. Table 1 shows a report format used for beam measurement in the R15 protocol. A CSI-RS index (CRI) field and an SSB resource index (SSBRI) field are used to indicate a to-be-reported resource index. Only the CRI or the SSBRI may be reported, or both the CRI and the SSBRI may be reported. $\lceil \log_2(K^{CSI\text{-}RS}_s) \rceil$ and $\lceil \log_2(K^{SSB}_s) \rceil$ are lengths of a CRI field and an SSBRI field. RSRP is quality of a resource. Reference signal received power (RSRP) is reported by using a differential report criterion. In other words, RSRP (an RSRP field in Table 1) of an optimal resource is reported through 7-bit quantization, and other RSRP (differential RSRP in Table 1) fields are reported through 4-bit quantization. The report information may be carried on a physical uplink control channel or a physical uplink shared channel.

TABLE 1

| Field | Bitwidth |
| --- | --- |
| CRI | $\lceil \log_2(K^{CSI\text{-}RS}_s) \rceil$ |
| SSBRI | $\lceil \log_2(K^{SSB}_s) \rceil$ |
| RSRP | 7 |
| Differential RSRP | 4 |

Figure 3:
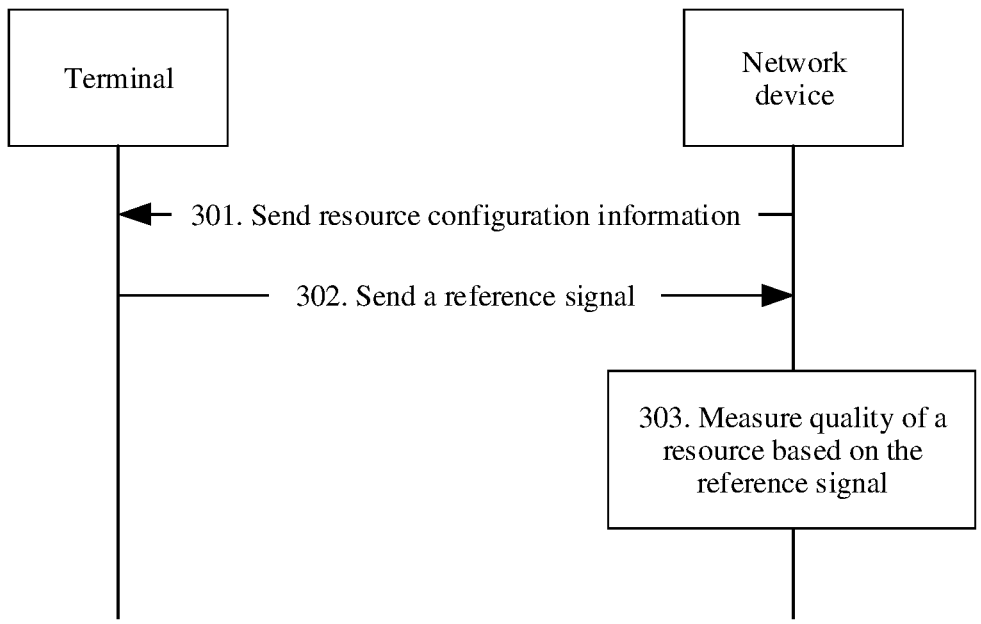
FIG. 3 is a schematic flowchart of an uplink beam management method in a conventional solution.

FIG. 3 is a schematic flowchart of an uplink beam management method in a conventional solution.

301. A network device sends resource configuration information of an uplink signal to a terminal.

The uplink signal may be an SRS. The network device may configure, for the terminal, one or more SRS resource sets used for uplink beam management, and each SRS resource set includes one or more SRS resources. Each SRS resource is associated with one beam, and each SRS resource corresponds to one SRS signal. Uplink beam measurement may be performed by measuring SRS signals corresponding to these SRS resources.

A specific format of an SRS resource configuration is as follows:
SRS-ResourceSet::=SEQUENCE {
  <Index of SRS-ResourceSet>
  srs-ResourceSetId SRS-ResourceSetId,
  <SRS-Resource included in SRS-ResourceSet>
  srs-ResourceIdList SEQUENCE (SIZE(1 . . . maxNrofSRS-ResourcesPerSet)) OF SRS-ResourceId
  <SRS-ResourceSet type: aperiodic, semi-persistent, or periodic>
  resource Type CHOICE {
    aperiodic SEQUENCE { . . . },
    semi-persistent SEQUENCE { . . . },
    periodic SEQUENCE { . . . }
  },
  <Functions of SRS-ResourceSet: beam management, codebook-based uplink transmission, non-codebook-based uplink transmission, and uplink channel measurement>
  usage ENUMERATED {beamManagement, codebook, nonCodebook, antennaSwitching},}
SRS-Resource::=SEQUENCE {
  <Index of SRS-Resource>
  srs-ResourceId SRS-ResourceId,
  <Quantity of SRS-Resource antenna ports>
  nrofSRS-Ports ENUMERATED {port1, ports2, ports4},
  <Time-frequency resource location corresponding to SRS-Resource>
  resourceMapping SEQUENCE { . . . },
  <SRS-ResourceSet type: aperiodic, semi-persistent, or periodic>
  resource Type CHOICE {
    aperiodic SEQUENCE { . . . },
    semi-persistent SEQUENCE { . . . },
    periodic SEQUENCE { . . . }
  },
  <Spatial information of SRS-ResourceSet, used to indicate an occurrence space parameter of the SRS resource>
  spatialRelationInfo SRS-SpatialRelationInfo . . .
}

302. The terminal sends, based on a configuration of each SRS resource, a corresponding SRS signal by using an uplink transmit beam associated with the SRS resource.

303. The network device measures quality of each SRS resource based on each SRS signal sent by the terminal.

Figure 4:
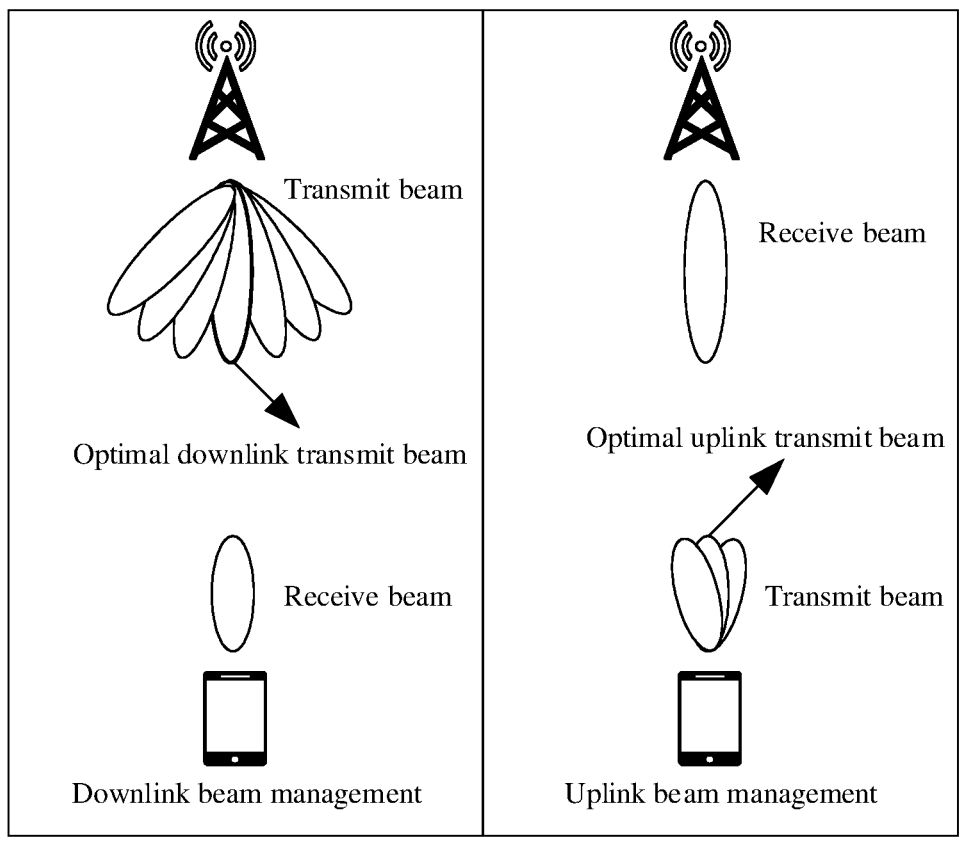
FIG. 4 is a schematic diagram of beam management in a conventional solution.

Downlink beam management is used by the network device to select a transmit beam for downlink data transmission. As shown in FIG. 4, the network device configures a plurality of downlink signal resources for the terminal by using measurement configuration information, and each downlink signal resource corresponds to one beam. Each downlink signal resource corresponds to one downlink signal, and the downlink signal resource can be measured by measuring the downlink signal. For each downlink signal resource, the network device sends a corresponding downlink signal by using a beam corresponding to the downlink signal resource. The terminal measures a downlink signal sent by each beam, to determine quality of the beam. The quality of the beam may be represented by using RSRP. By measuring RSRP of each beam, the terminal selects one or more downlink signal resources with largest RSRP, and reports indexes of the selected downlink signal resources and corresponding RSRP to the network device. The network device then selects one or more downlink signal resources (beams) from the downlink signal resources, and uses the downlink signal resources for downlink data transmission.

A beam is generated by using an antenna panel, that is, processing (for example, phase weighting processing) is performed on all antennas on an antenna panel to form a beam signal. Each antenna panel can generate a plurality of beams with different directions, but only one beam can be generated at a time. The terminal may be equipped with a plurality of antenna panels, and the terminal may select an antenna panel with good quality for data transmission. In addition, the terminal may turn off some antenna panels, to save electric energy. When some antenna panels are turned off, the network device cannot schedule these antenna panels to perform uplink data transmission. If the network device does not know which antenna panels are turned on and which antenna panels are turned off, the network device may perform incorrect scheduling. For example, the network device schedules a turned-off antenna panel to perform uplink data transmission, causing low data transmission efficiency.

It should be understood that the antenna panel may be referred to as a panel for short. Turning on the antenna panel may be described as activating the antenna panel, and turning off the antenna panel may be described as deactivating the antenna panel. An index of the antenna panel may be an index value specially used to identify the antenna panel. Unless otherwise specified, the antenna panel in the embodiments is the antenna panel of the terminal.

Figure 5:
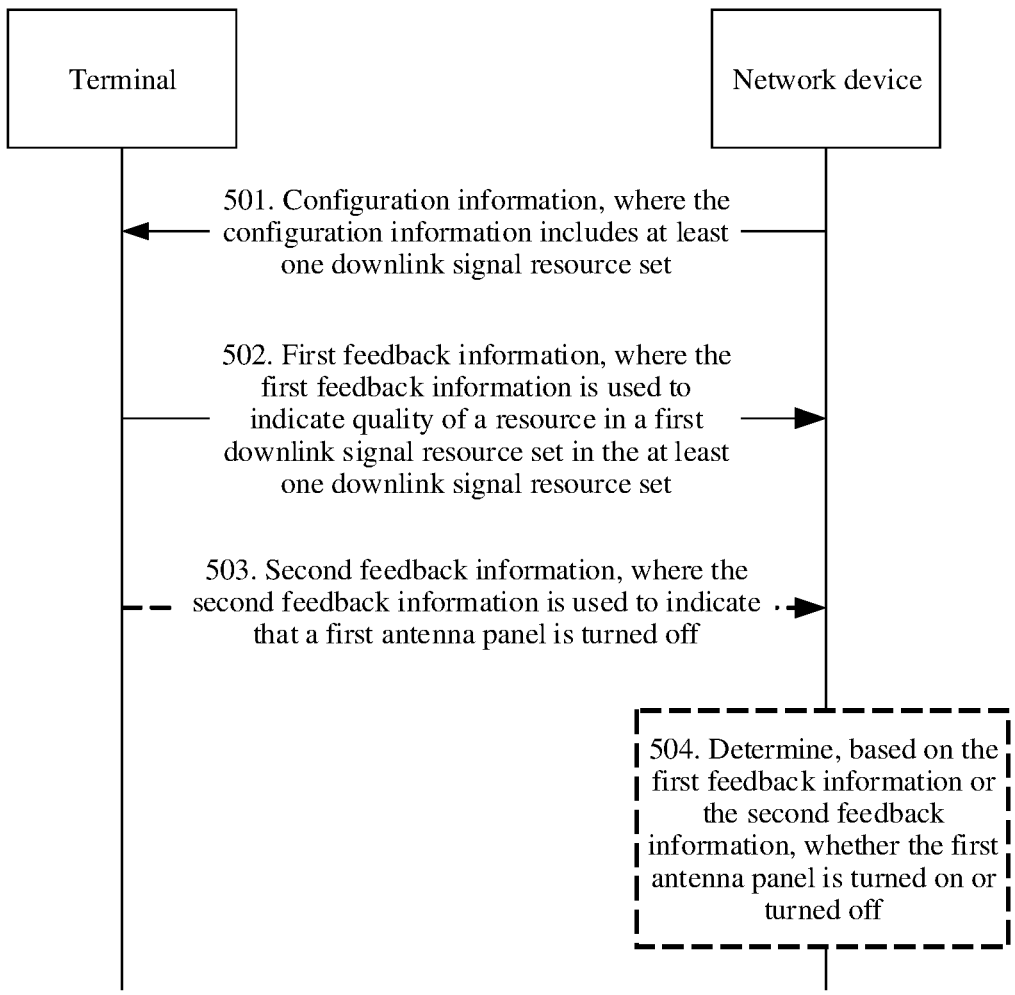
FIG. 5 is a schematic flowchart of a method for determining a status of an antenna panel according to an embodiment.

FIG. 5 is a schematic flowchart of a method for determining a status of an antenna panel according to an embodiment.

It should be noted that this embodiment may be performed by a terminal, or by a chip in the terminal. An execution body of the peer side may be a network device, or may be a chip in the network device. For ease of description, the "terminal" and the "network device" are used as examples for description in the following embodiments. However, is the embodiments are not limited thereto.

501. The terminal receives configuration information, where the configuration information includes at least one downlink signal resource set. Correspondingly, the network device sends the configuration information.

For example, the terminal receives the configuration information, and measures quality of a resource in each of the at least one downlink signal resource set based on the configuration information. Each downlink signal resource set includes at least one resource.

It should be noted that each downlink signal resource corresponds to a downlink signal, and the terminal may determine quality of a downlink signal by receiving the downlink signal corresponding to each downlink signal resource and determine the quality of the downlink signal as quality of the corresponding downlink signal resource.

It should be understood that the at least one downlink signal resource set may be one downlink signal resource set, or may be a plurality of downlink signal resource sets. The at least one resource may be one resource, or may be a plurality of resources.

It should be further understood that the configuration information in this embodiment may be the "measurement configuration information" in the embodiment shown in FIG. 2, or may be another name. A name of the configuration information is not limited in this embodiment.

Optionally, the resource in the downlink signal resource set may be a non-zero-power channel state information reference signal (NZP CSI-RS) resource, a synchronization signal and PBCH block (SSB), a channel state information-interference measurement (CSI-IM) resource, or a zero-power channel state information reference signal (ZP CSI-RS) resource.

502. The terminal sends first feedback information when a first antenna panel corresponding to a first downlink signal resource set in the at least one downlink signal resource set is turned on, where the first feedback information is used to indicate quality of a resource in the first downlink signal resource set, and the quality of the resource in the first downlink signal resource set is obtained by measuring a downlink signal by the first antenna panel. Correspondingly, the network device receives the first feedback information.

For example, the at least one downlink signal resource set has a correspondence with at least one antenna panel. To measure quality of a resource in a downlink signal resource set (for example, the first downlink signal resource set), the terminal needs to perform measurement by using an antenna panel (for example, the first antenna panel) corresponding to the first downlink signal resource set. Before the measurement, the terminal needs to determine whether the first antenna panel is turned on or turned off. When the first antenna panel is turned on, the terminal may measure quality of any resource in the first downlink signal resource set by using the first antenna panel. When the first antenna panel is turned off, the terminal does not measure quality of a resource in the first downlink signal resource set. The first feedback information may indicate quality of some resources in the first downlink signal resource set, or may indicate quality of all resources in the first downlink signal resource set.

It should be noted that any resource in the first downlink signal resource set may correspond to a downlink signal, and different resources in the first downlink signal resource set may correspond to a same downlink signal or different downlink signals.

It should be further noted that quality of a resource in another downlink signal resource set in the at least one downlink signal resource set except the first downlink signal resource set may also be measured depending on whether a corresponding antenna panel is turned on. In addition, the first feedback information used to indicate quality of resources in different downlink signal resource sets may be simultaneously sent to the network device, or may be separately sent to the network device. This is not limited in the embodiments.

It should be further noted that the first feedback information may carry an index of a resource in a downlink signal resource set. In this way, the network device can learn of, based on the first feedback information, a specific resource whose resource quality is included in the first feedback information. The network device then determines a status of a corresponding antenna panel based on a downlink signal resource set to which the resource belongs.

Optionally, the quality of the resource may be represented by using at least one of the following: a resource index (CRI), an SSB index, RSRP, reference signal received quality (RSRQ), a signal to interference plus noise ratio (SINR), a channel quality indicator (CQI), a rank indicator (RI) of a channel, a precoding matrix indicator (PMI), a layer indicator (LI), a signal-to-interference ratio, a signal-to-noise ratio, and the like.

In an embodiment, the first antenna panel corresponding to the first downlink signal resource set may be obtained based on a first mapping relationship. That is, the first mapping relationship stores the at least one downlink signal resource set and the at least one antenna panel. The first downlink signal resource set is any one of the at least one downlink signal resource set in the first mapping relationship, and the first antenna panel is any one of the at least one antenna panel in the first mapping relationship.

It should be noted that the first mapping relationship may be represented in a form of a table. The antenna panel may be identified by using an index.

It should be understood that the downlink signal resource set may be a resource set, or may be a resource setting. When the downlink signal resource set is a resource set, a plurality of resource sets may be configured in one resource setting, or some or all of the resource sets may be configured in different resource settings.

Optionally, the terminal may determine, based on the first mapping relationship and the first downlink signal resource set, the first antenna panel corresponding to the first downlink signal resource set, where the first mapping relationship is a mapping relationship between the at least one downlink signal resource set and the at least one antenna panel.

For example, the terminal may store the mapping relationship between the at least one downlink signal resource set and the at least one antenna panel. In this way, after receiving the configuration information, the terminal may determine, based on the mapping relationship, an antenna panel corresponding to each of the at least one downlink signal resource set included in the configuration information, and then determine, depending on whether the antenna panel is turned on, to send the first feedback information or second feedback information.

It should be noted that one downlink signal resource set may correspond to one or more antenna panels, or one or more downlink signal resource sets correspond to one antenna panel. This is not limited in the embodiments.

It should be understood that the first mapping relationship may be specified in a protocol, may be agreed upon by the network device and the terminal in advance, or may be determined by the network device and notified to the terminal by the network device. This is not limited in the embodiments.

Optionally, the network device may send indication information, where the indication information is used to indicate the first mapping relationship.

For example, the indication information may be separately sent, or may be carried in the configuration information, or carried in radio resource control (RRC) signaling, a media access control control element (MAC CE), or downlink control information (DCI). This is not limited in the embodiments.

In another embodiment, a second mapping relationship is a mapping relationship between at least one report configuration and the at least one downlink signal resource set, and a third mapping relationship is a mapping relationship between at least one report configuration and at least one antenna panel. The first downlink signal resource set may be any one of the at least one downlink signal resource set, a first report configuration corresponding to the first downlink signal resource set may be any one of the at least one report configuration, and the first antenna panel may be an antenna panel that is in the at least one antenna panel and that corresponds to the first report configuration.

It should be noted that the second mapping relationship or the third mapping relationship may be specified in a protocol, may be agreed upon by the network device and the terminal in advance, or may be determined by the network device and notified to the terminal by the network device. This is not limited in the embodiments.

Optionally, the terminal may determine, based on a second mapping relationship, a third mapping relationship, and the first downlink signal resource set, the first antenna panel corresponding to the first downlink signal resource set, where the second mapping relationship is a mapping relationship between at least one report configuration and the at least one downlink signal resource set, and the third mapping relationship is a mapping relationship between at least one report configuration and at least one antenna panel.

For example, the terminal may determine, based on the second mapping relationship and the first downlink signal resource set, a first report configuration corresponding to the first downlink signal resource set. Alternatively, the terminal may determine, based on the third mapping relationship and the first report configuration, the first antenna panel corresponding to the first report configuration. In this way, the terminal may determine that the first downlink signal resource set corresponds to the first antenna panel.

It should be noted that, one downlink signal resource set may correspond to one or more report configurations, or one or more downlink signal resource sets correspond to one report configuration. In addition, one report configuration corresponds to one or more antenna panels, or one or more report configurations correspond to one antenna panel. This is not limited in the embodiments.

Optionally, the configuration information may include the at least one report configuration. That is, the at least one report configuration in the configuration information has a mapping relationship with the at least one downlink signal resource set in the configuration information.

503. The terminal sends the second feedback information when the first antenna panel corresponding to the first downlink signal resource set in the at least one downlink signal resource set is turned off, where the second feedback information is used to indicate that the first antenna panel is turned off. Correspondingly, the network device receives the second feedback information. It should be noted that the second feedback information may carry an index of a resource in a downlink signal resource set. In this way, the network device can learn of, based on the second feedback information, a specific resource whose resource quality is included in the second feedback information. The network device then determines a status of a corresponding antenna panel based on a downlink signal resource set to which the resource belongs.

It should be noted that after performing step 501, the terminal may perform step 502 or step 503. This is not limited in the embodiments.

Optionally, the second feedback information may include at least one field; and when the at least one field is a preset value, the value of the at least one field indicates that the first antenna panel is turned off.

For example, both the first feedback information and the second feedback information may be represented by using at least one field, and are distinguished by using values of the at least one field. For example, when the value of the at least one field is a special value (for example, referred to as a "preset value"), the value of the at least one field indicates that the first antenna panel is turned off.

For example, the at least one field is 7 bits, that is, the value of the at least one field may range from 0 to 127, and any special value may be preset. When the terminal determines that the first antenna panel is turned off, the value of the at least one field is the special value, for example, 0 or 1 for all bits. After receiving the second feedback information, the network device obtains, through parsing, that the value of the at least one field in the second feedback information is the special value. In this case, the network device determines that the first antenna panel is turned off.

Optionally, the first feedback information and the second feedback information are also represented by using different fields.

504. The network device determines, based on the first feedback information or the second feedback information, whether the first antenna panel is turned on or turned off.

Therefore, according to the method for determining a status of an antenna panel in this embodiment, to measure the quality of the resource in the first downlink signal resource set, the terminal needs to perform measurement by using the first antenna panel corresponding to the first downlink signal resource set. Before the measurement, the terminal needs to determine whether the first antenna panel is turned on or turned off. When the first antenna panel is turned on, the terminal may measure the quality of the resource in the first downlink signal resource set by using the first antenna panel, and send the first feedback information. The first feedback information may indicate the quality of the resource in the first downlink signal resource set. When the first antenna panel is turned off, the terminal skips measuring the quality of the resource in the first downlink signal resource set, and sends second feedback information. The second feedback information is used to indicate that the first antenna panel is turned off. In this way, the network device in this embodiment can learn of a status of an antenna panel, and can properly schedule the antenna panel, thereby improving data transmission efficiency.

Uplink beam management is used by the terminal to select a transmit beam for uplink data transmission. As shown in FIG. 4, the network device configures a plurality of uplink signal resources for the terminal by using measurement configuration information, and each uplink signal resource corresponds to one beam. Each uplink signal resource includes one uplink signal, and the uplink signal resource can be measured by measuring the uplink signal. For each uplink signal resource, the terminal sends a corresponding uplink signal by using a beam corresponding to the uplink signal resource. The terminal measures an uplink signal sent by each beam, to determine quality of each beam/uplink signal resource. For example, during data transmission, the network device indicates an index of an uplink signal resource by using the downlink control information, and the terminal sends uplink data by using a beam corresponding to the uplink signal resource.

The terminal may be equipped with a plurality of antenna panels, and the terminal may select an antenna panel with good quality for data transmission. In addition, the terminal may turn off some antenna panels, to save electric energy. When some antenna panels are turned off, the network device cannot schedule these antenna panels to perform uplink data transmission. If the network device does not know which antenna panels are turned on and which antenna panels are turned off, the network device may perform incorrect scheduling. For example, the network device schedules a turned-off antenna panel to perform uplink data transmission, causing low data transmission efficiency.

Figure 6:
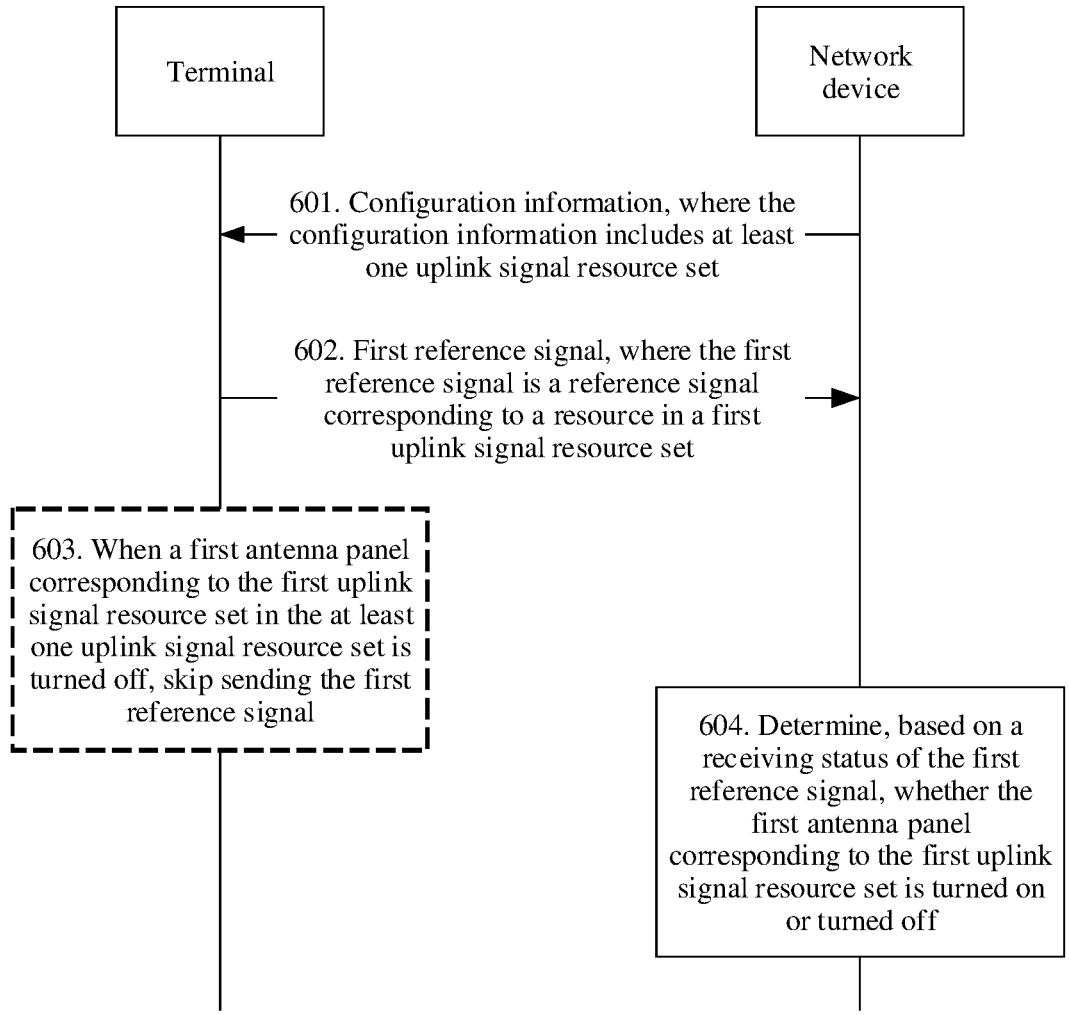
FIG. 6 is a schematic flowchart of a method for determining a status of an antenna panel according to another embodiment.

FIG. 6 is a schematic flowchart of a method for determining a status of an antenna panel according to another embodiment of the embodiments.

It should be noted that this embodiment may be performed by a terminal, or by a chip in the terminal. An execution body of the peer side may be a network device, or may be a chip in the network device. For ease of description, the "terminal" and the "network device" are used as examples for description in the following embodiments. However, the embodiments are not limited thereto.

It should be further noted that, unless otherwise specified, meanings of same terms in this embodiment are the same as those in the embodiment shown in FIG. 5.

601. The terminal receives first configuration information, where the first configuration information includes at least one uplink signal resource set. Correspondingly, the network device sends the first configuration information.

For example, an uplink signal resource set may include one or more resources, and the terminal may transmit an uplink signal on the resources, so that the network device can determine quality of the uplink signal resources based on the uplink signal.

It should be understood that the first configuration information may be the same as the configuration information in the embodiment shown in FIG. 5.

602. When a first antenna panel corresponding to a first uplink signal resource set in the at least one uplink signal resource set is turned on, the terminal sends a first reference signal, where the first reference signal is a reference signal corresponding to a resource in the first uplink signal resource set. Correspondingly, the network device detects the first reference signal, and receives the first reference signal.

For example, an uplink signal resource set has a correspondence with an antenna panel, and a resource in the uplink signal resource set has a correspondence with a reference signal. The terminal determines whether the first antenna panel corresponding to the first uplink signal resource set is turned on, and if the first antenna panel is turned on, sends the first reference signal by using the first antenna panel. The first uplink signal resource set may be any one of the at least one uplink signal resource set. That is, the terminal sends, by using an antenna panel corresponding to each uplink signal resource set, a reference signal corresponding to the uplink signal resource set. Correspondingly, the network device detects a reference signal corresponding to a resource in each uplink signal resource set.

It should be noted that one resource in the uplink signal resource set may correspond to one reference signal, and different resources in the uplink signal resource set may correspond to different reference signals respectively, or may correspond to a same reference signal. This is not limited in the embodiments.

It should be understood that, that the network device "detects" a reference signal may be understood as that the network device "monitors" a reference signal.

Optionally, the first reference signal is used to measure quality of a first resource in the first uplink signal resource set.

For example, the terminal may reuse a reference signal (for example, the first reference signal) used to measure resource quality in a conventional solution. In this way, the terminal does not need to specially send the first reference signal to help the network device determine, based on the first reference signal, whether the antenna panel is turned on or turned off. Correspondingly, the network device does not need to specially monitor the first reference signal, thereby reducing signaling and resource overheads.

Optionally, the at least one uplink signal resource set may have a mapping relationship with at least one antenna panel, and the first antenna panel is an antenna panel that is in the at least one antenna panel and that corresponds to the first uplink signal resource set.

For example, the terminal may determine, based on the mapping relationship, an antenna panel corresponding to each uplink signal resource set.

It should be noted that one uplink signal resource set may correspond to one or more antenna panels, or one or more uplink signal resource sets correspond to one antenna panel. This is not limited in the embodiments.

It should be understood that the mapping relationship may be specified in a protocol, may be agreed upon by the network device and the terminal in advance, or may be determined by the network device and notified to the terminal by the network device. This is not limited in the embodiments.

603. When a first antenna panel corresponding to a first uplink signal resource set in the at least one uplink signal resource set is turned off, the terminal skips sending a first reference signal, where the first reference signal is a reference signal corresponding to a resource in the first uplink signal resource set. Correspondingly, the network device detects the first reference signal.

For example, if the first antenna panel corresponding to the first uplink signal resource set is turned off, the terminal skips sending the reference signal corresponding to the resource in the first uplink signal resource set.

604. The network device determines, based on a receiving status of the first reference signal, whether the first antenna panel corresponding to the first uplink signal resource set is turned on or turned off.

For example, the network device may separately determine, based on a receiving status of a reference signal corresponding to a resource in an uplink signal resource set, a status of an antenna panel corresponding to each uplink signal resource set. In other words, the network device in this embodiment can learn of a status of an antenna panel, and can properly schedule the antenna panel, thereby improving data transmission efficiency.

Optionally, if a result of detecting the first reference signal by the network device is that shown in step 603, that is, the network device does not receive the first reference signal, the network device determines that the first antenna panel is turned off.

It should be noted that, when the network device detects the first reference signal, the network device may determine, when the network device does not receive the first reference signal for one time, that the first antenna panel is turned off, or may determine, when the network device does not receive the first reference signal for a plurality of times, that the first antenna panel is turned off.

Optionally, if a result of detecting the first reference signal by the network device is that shown in step 602, the network device may determine that the first antenna panel is turned on.

Optionally, if a result of detecting the first reference signal by the network device is that shown in step 602, the network device may further determine quality of the first reference signal. When the quality of the first reference signal is greater than a preset quality threshold, it is determined that the first antenna panel is turned on: or when the quality of the first reference signal is less than or equal to a preset quality threshold, it is determined that the first antenna panel is turned off.

It should be noted that the network device may determine, when the network device detects that the quality of the first reference signal is less than or equal to the preset quality threshold for a plurality of times, that the first antenna panel is turned off.

Optionally, after step 604, if the first antenna panel is turned off, the network device may further send second configuration information to the terminal, where the second configuration information is used to adjust a configuration parameter of the first antenna panel. Correspondingly, the terminal receives the second configuration information, and adjusts the configuration parameter of the first antenna panel based on the second configuration information.

For example, when the network device learns that the first antenna panel is turned off, the network device may send the second configuration information to adjust the first antenna panel, for example, adjust the first antenna panel to a turned-on state. In this case, the network device can schedule the first antenna panel to perform data transmission, thereby improving the data transmission efficiency.

Optionally, the second configuration information may be separately sent, or may be carried in any one of RRC signaling, MAC CE signaling, or DCI signaling. This is not limited in the embodiments.

Optionally, the second configuration information includes a reconfigured or activated configuration parameter.

Optionally, the second configuration information may further include a deactivated configuration parameter or a released configuration parameter. In other words, when a new configuration parameter is configured, an original configuration parameter may be deleted.

Optionally, the configuration parameter includes at least one of a measurement report related configuration, a measurement resource related configuration, a TCI status, a spatial relation, an uplink scheduling request (SR) resource, or a physical uplink control channel resource.

For example, the measurement report related configuration may be reportConfig, and the measurement resource related configuration may be at least one of a resource, a resource set, a resource setting, an SRS resource, an SRS resource set, a timing advance (TA), a timing advance group (TAG), a physical random access channel (PRACH) related resource, a configured uplink grant, and a semi-persistent physical uplink shared channel (PUSCH) resource. The configuration parameter may further include a hybrid automatic repeat request (HARQ) process and a power control related parameter.

The embodiments provided may be independent solutions, or may be combined based on internal logic. These solutions all fall within the protection scope of the embodiments.

It may be understood that in the foregoing method embodiments, the methods and operations that are implemented by the terminal may alternatively be implemented by a component (for example, a chip or a circuit) that may be used in the terminal, and the methods and the operations that are implemented by the access network device may alternatively be implemented by a component (for example, a chip or a circuit) that may be used in the access network device.

The foregoing mainly describes the solutions provided in the embodiments from a perspective of interaction. It may be understood that, to implement the foregoing functions, each network element, such as a transmit end device or a receive end device, includes a corresponding hardware structure and/or software module for performing each function. A person of ordinary skill in the art may be aware that, with reference to the examples described in the embodiments, units and algorithm steps may be implemented by hardware or a combination of computer software and hardware in the embodiments. Whether a specific function is performed by hardware or hardware driven by computer software depends on particular applications and design constraints of the solutions. A person of ordinary skill in the art may use different methods to implement the described functions for each particular application, but it should not be considered that the implementation goes beyond the scope of the embodiments.

In the embodiments, a transmit end device or a receive end device may be divided into functional modules based on the foregoing method examples. For example, the transmit end device or the receive end device may be divided into functional modules corresponding to functions, or two or more functions may be integrated into one processing module. The integrated module may be implemented in a form of hardware, or may be implemented in a form of a software functional module. It should be noted that, in the embodiments, module division is used as an example, and is merely a logical function division. In actual implementation, another division manner may be used. An example in which each functional module is obtained through division based on a corresponding function is used below for description.

It should be understood that in the embodiments, specific examples are merely intended to help a person skilled in the art better understand the embodiments ion, rather than limit the scope of the embodiments.

It should be understood that, in the embodiments, sequence numbers of the foregoing processes do not mean execution sequences. The execution sequences of the processes should be determined based on functions and internal logic of the processes, and should not constitute any limitation to implementation processes of the embodiments.

The foregoing describes in detail the methods provided in the embodiments with reference to FIG. 5 and FIG. 6. The following describes in detail apparatuses provided in the embodiments with reference to FIG. 7 to FIG. 18. It should be understood that descriptions of the apparatus embodiments correspond to the descriptions of the method embodiments. Therefore, for content that is not described in detail, refer to the foregoing method embodiments. For brevity, details are not described herein again.

Figure 7:
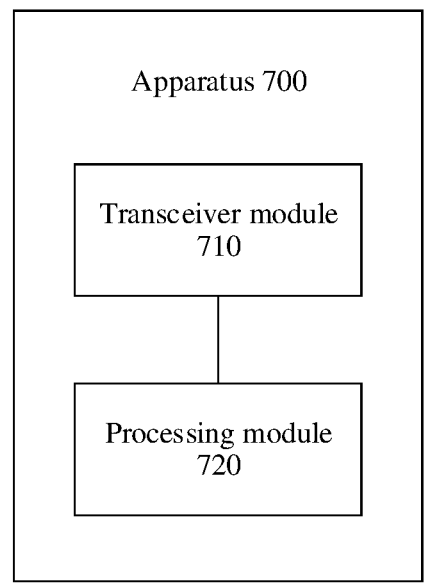
FIG. 7 is a schematic block diagram of an apparatus for determining a status of an antenna panel according to an embodiment.

FIG. 7 is a schematic block diagram of an apparatus 700 for determining a status of an antenna panel according to an embodiment.

It should be understood that the apparatus 700 may correspond to the terminal in the embodiment shown in FIG. 3, and may have any function of the terminal in the method. The apparatus 700 includes a transceiver module 710 and a processing module 720. The transceiver module may include a sending module and/or a receiving module.

The transceiver module 710 is configured to receive configuration information, where the configuration information includes at least one downlink signal resource set.

The processing module 720 is configured to: control the transceiver module to send first feedback information when a first antenna panel corresponding to a first downlink signal resource set in the at least one downlink signal resource set is turned on, where the first feedback information is used to indicate quality of a resource in the first downlink signal resource set, and the quality of the resource in the first downlink signal resource set is obtained by measuring a downlink signal by the first antenna panel.

Alternatively, the processing module 720 is configured to: control the transceiver module to send second feedback information when a first antenna panel corresponding to a first downlink signal resource set in the at least one downlink signal resource set is turned off, where the second feedback information is used to indicate that the first antenna panel is turned off.

Optionally, the processing module 720 is further configured to: before the first feedback information or the second feedback information is sent, determine, based on a first mapping relationship and the first downlink signal resource set, the first antenna panel corresponding to the first downlink signal resource set, where the first mapping relationship is a mapping relationship between the at least one downlink signal resource set and at least one antenna panel.

Optionally, the processing module 720 is further configured to: before the first feedback information or the second feedback information is sent, determine, based on a second mapping relationship, a third mapping relationship, and the first downlink signal resource set, the first antenna panel corresponding to the first downlink signal resource set, where the second mapping relationship is a mapping relationship between at least one report configuration and the at least one downlink signal resource set, and the third mapping relationship is a mapping relationship between at least one report configuration and at least one antenna panel.

Optionally, the second feedback information includes at least one field; and when a value of the at least one field is a preset value, it indicates that the first antenna panel is turned off.

Figure 8:
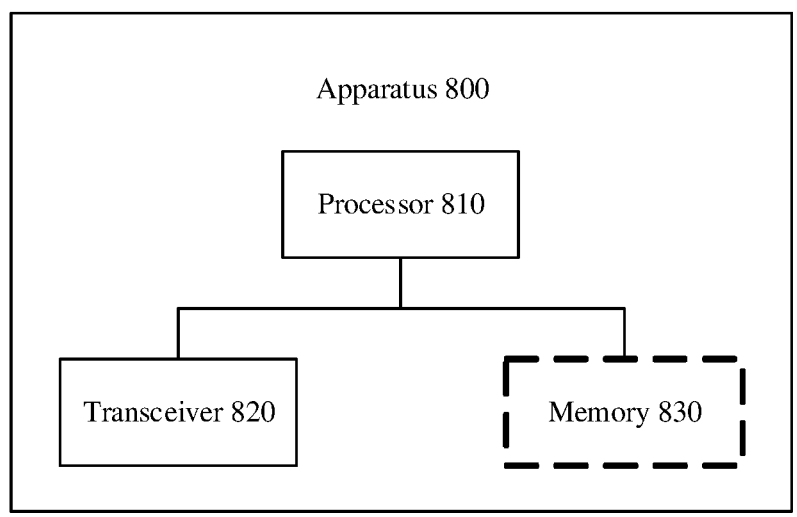
FIG. 8 is a schematic diagram of a structure of an apparatus for determining a status of an antenna panel according to an embodiment.

FIG. 8 shows a beam failure recovery apparatus 800 according to an embodiment. The apparatus 800 may be the terminal in FIG. 3. The apparatus may use a hardware architecture shown in FIG. 8. The apparatus may include a processor 810 and a transceiver 830. The transceiver may include a transmitter and/or a receiver. Optionally, the apparatus may further include a memory 840. The processor 810, the transceiver 830, and the memory 840 communicate with each other by using an internal connection path. A related function implemented by the processing module 720 in FIG. 7 may be implemented by the processor 810, and a related function implemented by the transceiver module 710 may be implemented by the processor 810 by controlling the transceiver 830.

Optionally, the processor 810 may be a CPU, a microprocessor, an ASIC, a special-purpose processor, or one or more integrated circuits configured to perform the solutions in the embodiments. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control the beam failure recovery apparatus (for example, a base station, a terminal, or a chip), execute a software program, and process data of the software program.

Optionally, the processor 810 may include one or more processors, for example, include one or more CPUs. When the processor is one CPU, the CPU may be a single-core CPU or a multi-core CPU.

The transceiver 830 is configured to send data and/or a signal, and receive data and/or a signal. The transceiver may include a transmitter and a receiver. The transmitter is configured to send data and/or a signal, and the receiver is configured to receive data and/or a signal.

The memory 840 includes, but is not limited to, a random access memory (RAM), a read-only memory (ROM), an erasable programmable memory (EPROM), and a compact disc read-only memory (CD-ROM). The memory 840 is configured to store related instructions and data.

The memory 840 is configured to store program code and data of the terminal, and may be a separate device or integrated into the processor 810.

For example, the processor 810 is configured to control the transceiver to perform information transmission with the terminal. For details, refer to the descriptions in the foregoing method embodiments. Details are not described herein again.

During specific implementation, in an embodiment, the apparatus 800 may further include an output device and an input device. The output device communicates with the processor 810, and may display information in a plurality of manners. For example, the output device may be a liquid crystal display (LCD), a light emitting diode (LED) display device, a cathode ray tube (CRT) display device, a projector, or the like. The input device communicates with the processor 810, and may receive an input from a user in a plurality of manners. For example, the input device may be a mouse, a keyboard, a touchscreen device, or a sensor device.

It may be understood that FIG. 8 shows only a simplified implementation of the beam failure recovery apparatus. During actual application, the apparatus may further include other necessary components, including but not limited to any quantity of transceivers, processors, controllers, memories, and the like, and all terminals that can implement this application shall fall within the protection scope of the embodiments.

In a possible implementation, the apparatus 800 may be a chip, for example, may be a communication chip that can be used in a terminal, and configured to implement a related function of the processor 810 in the terminal. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

An embodiment further provides an apparatus. The apparatus may be a terminal or a circuit. The apparatus may be configured to perform an action performed by the terminal in the foregoing method embodiments.

Figure 9:
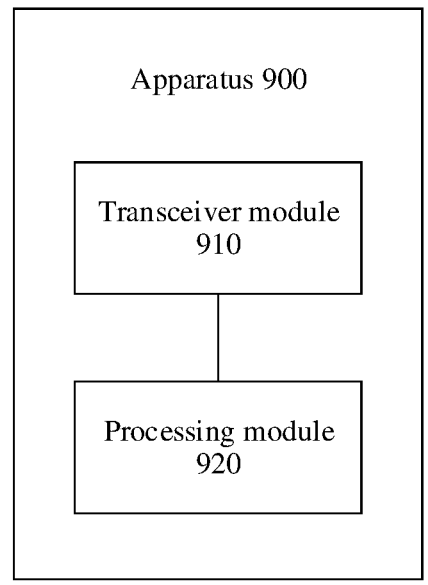
FIG. 9 is a schematic block diagram of an apparatus for determining a status of an antenna panel according to another embodiment.

FIG. 9 is a schematic block diagram of an apparatus 900 for determining a status of an antenna panel according to an embodiment.

It should be understood that the apparatus 900 may correspond to the network device in the embodiment shown in FIG. 3, and may have any function of the network device in the method. The apparatus 900 includes a transceiver module 910 and a processing module 920.

The transceiver module 910 is configured to send configuration information, where the configuration information includes at least one downlink signal resource set.

The transceiver module 910 is further configured to receive first feedback information or second feedback information, where the first feedback information is used to indicate quality of a resource in a first downlink signal resource set in the at least one downlink signal resource set, the quality of the resource in the first downlink signal resource set is obtained by a terminal by measuring a downlink signal when a first antenna panel corresponding to the first downlink signal resource set is turned on, and the second feedback information is used to indicate that the first antenna panel corresponding to the first downlink signal resource set in the at least one downlink signal resource set is turned off.

The processing module 920 is configured to determine, based on the first feedback information or the second feedback information, whether the first antenna panel is turned on or turned off.

Optionally, the at least one downlink signal resource set has a first mapping relationship with at least one antenna panel, and the first antenna panel is an antenna panel that is in the at least one antenna panel and that corresponds to the first downlink signal resource set.

Optionally, at least one report configuration has a second mapping relationship with the at least one downlink signal resource set, the at least one report configuration has a third mapping relationship with at least one antenna panel, the first antenna panel is an antenna panel that is in the at least one antenna panel and that corresponds to a first report configuration, and the first report configuration is a report configuration that is in the at least one report configuration and that corresponds to the first downlink signal resource set.

Optionally, the second feedback information includes at least one field; and when a value of the at least one field is a preset value, it indicates that the first antenna panel is turned off.

Figure 10:
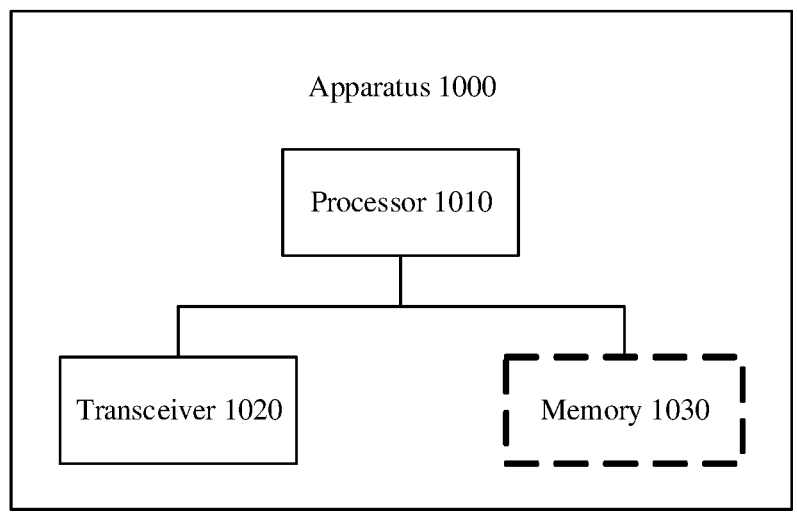
FIG. 10 is a schematic diagram of a structure of an apparatus for determining a status of an antenna panel according to another embodiment.

FIG. 10 shows an apparatus 1000 for determining a status of an antenna panel according to an embodiment. The apparatus 1000 may be the network device in FIG. 9. The apparatus may use a hardware architecture shown in FIG. 10. The apparatus may include a processor 1010 and a transceiver 1020. Optionally, the apparatus may further include a memory 1030. The processor 1010, the transceiver 1020, and the memory 1030 communicate with each other by using an internal connection path. A related function implemented by the processing module 920 in FIG. 9 may be implemented by the processor 1010, and a related function implemented by the transceiver module 910 may be implemented by the processor 1010 by controlling the transceiver 1020.

Optionally, the processor 1010 may be a CPU, a microprocessor, an ASIC, a special-purpose processor, or one or more integrated circuits configured to perform the solutions in the embodiments. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control the apparatus (for example, a base station, a terminal, or a chip) for determining a status of an antenna panel, execute a software program, and process data of the software program.

Optionally, the processor 1010 may include one or more processors, for example, include one or more CPUs. When the processor is one CPU, the CPU may be a single-core CPU or a multi-core CPU.

The transceiver 1020 is configured to send data and/or a signal, and receive data and/or a signal. The transceiver may include a transmitter and a receiver. The transmitter is configured to send data and/or a signal, and the receiver is configured to receive data and/or a signal.

The memory 1030 includes, but is not limited to, a RAM, a ROM, an EPROM, and a CD-ROM. The memory 1030 is configured to store related instructions and related data.

The memory 1030 is configured to store program code and data of a network device, and may be a separate device or integrated into the processor 1010.

For example, the processor 1010 is configured to control the transceiver to perform information transmission with the network device. For details, refer to the descriptions in the foregoing method embodiments. Details are not described herein again.

During specific implementation, in an embodiment, the apparatus 1000 may further include an output device and an input device. The output device communicates with the processor 1010, and may display information in a plurality of manners. For example, the output device may be an LCD, an LED display device, a CRT display device, or a projector. The input device communicates with the processor 901, and may receive an input from a user in a plurality of manners. For example, the input device may be a mouse, a keyboard, a touchscreen device, or a sensor device.

It may be understood that FIG. 10 shows only a simplified implementation of the apparatus for determining a status of an antenna panel. During actual application, the apparatus may further include other necessary components, including but not limited to any quantity of transceivers, processors, controllers, memories, and the like, and all network devices that can implement this application shall fall within the protection scope of the embodiments.

In a possible implementation, the apparatus 1000 may be a chip, for example, may be a communication chip that can be used in a network device, and configured to implement a related function of the processor 1010 in the network device. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

An embodiment further provides an apparatus. The apparatus may be a network device or a circuit. The apparatus may be configured to perform an action performed by the network device in the foregoing method embodiments.

Figure 11:
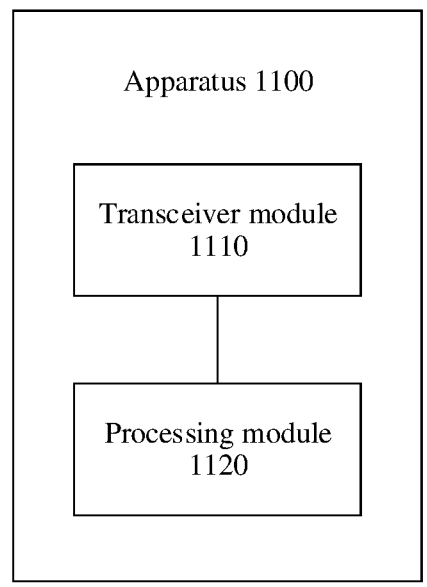
FIG. 11 is a schematic block diagram of an apparatus for determining a status of an antenna panel according to another embodiment.

FIG. 11 is a schematic block diagram of an apparatus 1100 for determining a status of an antenna panel according to an embodiment.

It should be understood that the apparatus 1100 may correspond to the terminal in the embodiment shown in FIG. 6, and may have any function of the terminal in the method. The apparatus 1100 includes a transceiver module 1110 and a processing module 1120. The transceiver module may include a sending module and/or a receiving module.

The transceiver module 1110 is configured to receive first configuration information, where the first configuration information includes at least one uplink signal resource set.

The processing module 1120 is configured to: when a first antenna panel corresponding to a first uplink signal resource set in the at least one uplink signal resource set is turned on, control the transceiver module to send a first reference signal by using the first antenna panel, where the first reference signal is a reference signal corresponding to a resource in the first uplink signal resource set.

The processing module 1120 is configured to: when a first antenna panel corresponding to a first uplink signal resource set in the at least one uplink signal resource set is turned off, control the transceiver module to skip sending a first reference signal, where the first reference signal is a reference signal corresponding to a resource in the first uplink signal resource set.

Optionally, the at least one uplink signal resource set has a first mapping relationship with at least one antenna panel, and the first antenna panel is an antenna panel that is in the at least one antenna panel and that corresponds to the first uplink signal resource set.

Optionally, the transceiver module 1110 is further configured to receive second configuration information. The processing module is further configured to adjust a configuration parameter of the first antenna panel based on the second configuration information.

Optionally, the second configuration information includes a reconfigured configuration parameter, and the configuration parameter includes at least one of a measurement report related configuration, a measurement resource related configuration, a transmission configuration indicator TCI status, a spatial relation, an uplink scheduling request SR resource, and a physical uplink control channel resource.

Figure 12:
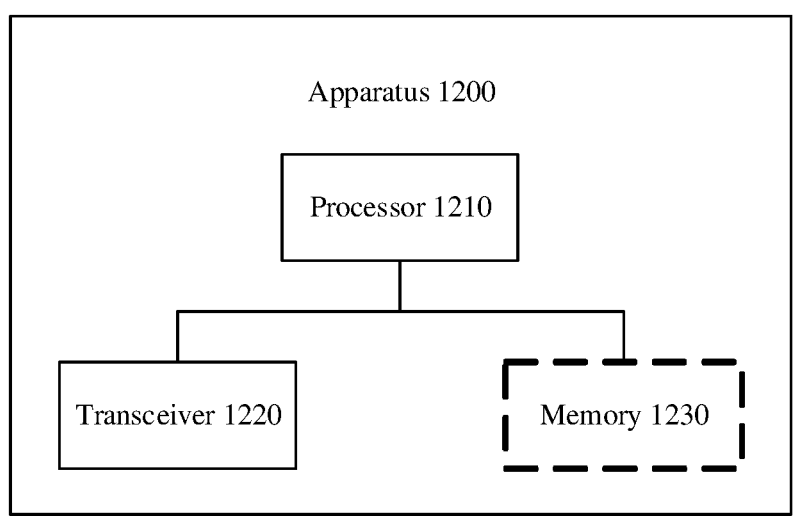
FIG. 12 is a schematic diagram of a structure of an apparatus for determining a status of an antenna panel according to another embodiment.

FIG. 12 shows a beam failure recovery apparatus 1200 according to an embodiment. The apparatus 1200 may be the terminal in FIG. 3. The apparatus may use a hardware architecture shown in FIG. 12. The apparatus may include a processor 1210 and a transceiver 1230. The transceiver may include a transmitter and/or a receiver. Optionally, the apparatus may further include a memory 1240. The processor 1210, the transceiver 1230, and the memory 1240 communicate with each other by using an internal connection path. A related function implemented by the processing module 1120 in FIG. 11 may be implemented by the processor 1210, and a related function implemented by the transceiver module 1110 may be implemented by the processor 1210 by controlling the transceiver 1230.

Optionally, the processor 1210 may be a CPU, a microprocessor, an ASIC, a special-purpose processor, or one or more integrated circuits configured to perform the solutions in the embodiments. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control the beam failure recovery apparatus (for example, a base station, a terminal, or a chip), execute a software program, and process data of the software program.

Optionally, the processor 1210 may include one or more processors, for example, include one or more CPUs. When the processor is one CPU, the CPU may be a single-core CPU or a multi-core CPU.

The transceiver 1230 is configured to send data and/or a signal, and receive data and/or a signal. The transceiver may include a transmitter and a receiver. The transmitter is configured to send data and/or a signal, and the receiver is configured to receive data and/or a signal.

The memory 1240 includes, but is not limited to, a RAM, a ROM, an EPROM, and a CD-ROM. The memory 1240 is configured to store related instructions and related data.

The memory 1240 is configured to store program code and data of the terminal, and may be a separate device or integrated into the processor 1210.

For example, the processor 1210 is configured to control the transceiver to perform information transmission with the terminal. For details, refer to the descriptions in the foregoing method embodiments. Details are not described herein again.

During specific implementation, in an embodiment, the apparatus 1200 may further include an output device and an input device. The output device communicates with the processor 1210, and may display information in a plurality of manners. For example, the output device may be an LCD, an LED display device, a CRT display device, or a projector. The input device communicates with the processor 601, and may receive an input from a user in a plurality of manners. For example, the input device may be a mouse, a keyboard, a touchscreen device, or a sensor device.

It may be understood that FIG. 12 shows only a simplified implementation of the beam failure recovery apparatus. During actual application, the apparatus may further include other necessary components, including, but not limited to, any quantity of transceivers, processors, controllers, memories, and the like, and all terminals that can implement this application shall fall within the protection scope of the embodiments.

In a possible implementation, the apparatus 1200 may be a chip, for example, may be a communication chip that can be used in a terminal, and configured to implement a related function of the processor 1210 in the terminal. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

An embodiment further provides an apparatus. The apparatus may be a terminal or a circuit. The apparatus may be configured to perform an action performed by the terminal in the foregoing method embodiments.

Figure 13:
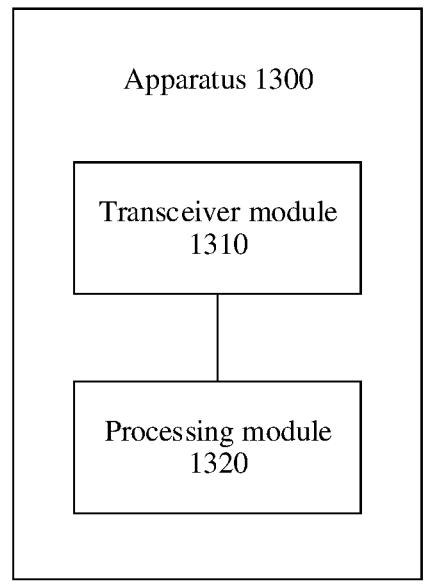
FIG. 13 is a schematic block diagram of an apparatus for determining a status of an antenna panel according to another embodiment.

FIG. 13 is a schematic block diagram of an apparatus 1300 for determining a status of an antenna panel according to an embodiment.

It should be understood that the apparatus 1300 may correspond to the network device in the embodiment shown in FIG. 6, and may have any function of the network device in the method. The apparatus 1300 includes a transceiver module 1310 and a processing module 1320. The transceiver module may include a sending module and/or a receiving module.

The transceiver module 1310 is configured to send first configuration information, where the first configuration information includes at least one uplink signal resource set.

The processing module 1320 is configured to detect a first reference signal corresponding to a first resource in a first uplink signal resource set in the at least one uplink signal resource set.

The processing module 1320 is further configured to determine, based on a receiving status of the first reference signal, whether a first antenna panel corresponding to the first uplink signal resource set is turned on or turned off.

Optionally, the at least one uplink signal resource set has a first mapping relationship with at least one antenna panel, and the first antenna panel is an antenna panel that is in the at least one antenna panel and that corresponds to the first uplink signal resource set.

Optionally, the processing module 1320 is configured to: when the first reference signal is not received, determine that the first antenna panel is turned off; when quality of the received first reference signal is less than or equal to a preset quality threshold, determine that the first antenna panel is turned off; or when quality of the received first reference signal is greater than a preset quality threshold, determine that the first antenna panel is turned on.

Optionally, the transceiver module 1310 is further configured to: when the first antenna panel is turned off, send second configuration information to a terminal, where the second configuration information is used to adjust a configuration parameter of the first antenna panel.

Optionally, the second configuration information includes a reconfigured configuration parameter, and the configuration parameter includes at least one of a measurement report related configuration, a measurement resource related configuration, a transmission configuration indicator TCI status, a spatial relation, an uplink scheduling request SR resource, and a physical uplink control channel resource.

Figure 14:
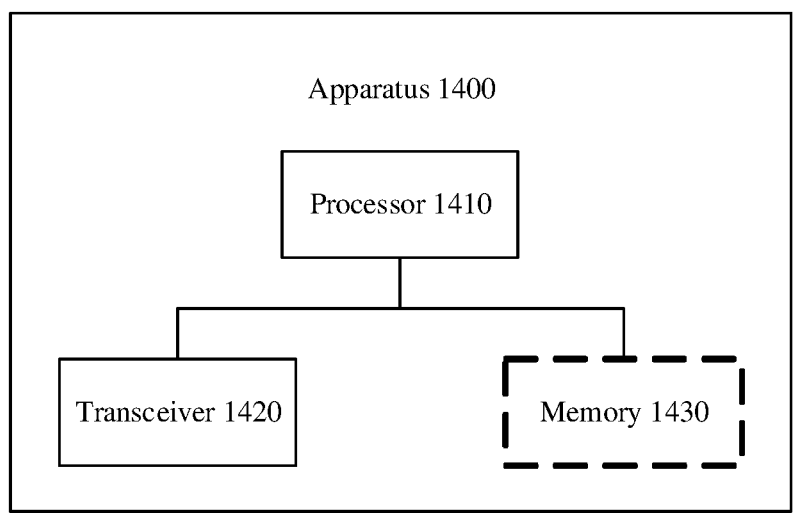
FIG. 14 is a schematic diagram of a structure of an apparatus for determining a status of an antenna panel according to another embodiment.

FIG. 14 shows a beam failure recovery apparatus 1400 according to an embodiment. The apparatus 1400 may be the network device in FIG. 6. The apparatus may use a hardware architecture shown in FIG. 14. The apparatus may include a processor 1410 and a transceiver 1430. The transceiver may include a transmitter and/or a receiver. Optionally, the apparatus may further include a memory 1440. The processor 1410, the transceiver 1430, and the memory 1440 communicate with each other by using an internal connection path. A related function implemented by the processing module 1320 in FIG. 13 may be implemented by the processor 1410, and a related function implemented by the transceiver module 1310 may be implemented by the processor 1410 by controlling the transceiver 1430.

Optionally, the processor 1410 may be a CPU, a microprocessor, an ASIC, a special-purpose processor, or one or more integrated circuits configured to perform the solutions in the embodiments. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control the beam failure recovery apparatus (for example, a base station, a terminal, or a chip), execute a software program, and process data of the software program.

Optionally, the processor 1410 may include one or more processors, for example, include one or more CPUs. When the processor is one CPU, the CPU may be a single-core CPU or a multi-core CPU.

The transceiver 1430 is configured to send data and/or a signal, and receive data and/or a signal. The transceiver may include a transmitter and a receiver. The transmitter is configured to send data and/or a signal, and the receiver is configured to receive data and/or a signal.

The memory 1440 includes, but is not limited to, a RAM, a ROM, an EPROM, and a CD-ROM. The memory 1440 is configured to store related instructions and related data.

The memory 1440 is configured to store program code and data of a network device, and may be a separate device or integrated into the processor 1410.

For example, the processor 1410 is configured to control the transceiver to perform information transmission with the network device. For details, refer to the descriptions in the foregoing method embodiments. Details are not described herein again.

During specific implementation, in an embodiment, the apparatus 1400 may further include an output device and an input device. The output device communicates with the processor 1410, and may display information in a plurality of manners. For example, the output device may be an LCD, an LED display device, a CRT display device, or a projector. The input device communicates with the processor 601, and may receive an input from a user in a plurality of manners. For example, the input device may be a mouse, a keyboard, a touchscreen device, or a sensor device.

It may be understood that FIG. 14 shows only a simplified implementation of the beam failure recovery apparatus. During actual application, the apparatus may further include other necessary components, including but not limited to any quantity of transceivers, processors, controllers, memories, and the like, and all network devices that can implement this application shall fall within the protection scope of the embodiments.

In a possible implementation, the apparatus 1400 may be a chip, for example, may be a communication chip that can be used in a network device, and configured to implement a related function of the processor 1410 in the network device. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

An embodiment further provides an apparatus. The apparatus may be a network device or a circuit. The apparatus may be configured to perform an action performed by the network device in the foregoing method embodiments.

Figure 15:
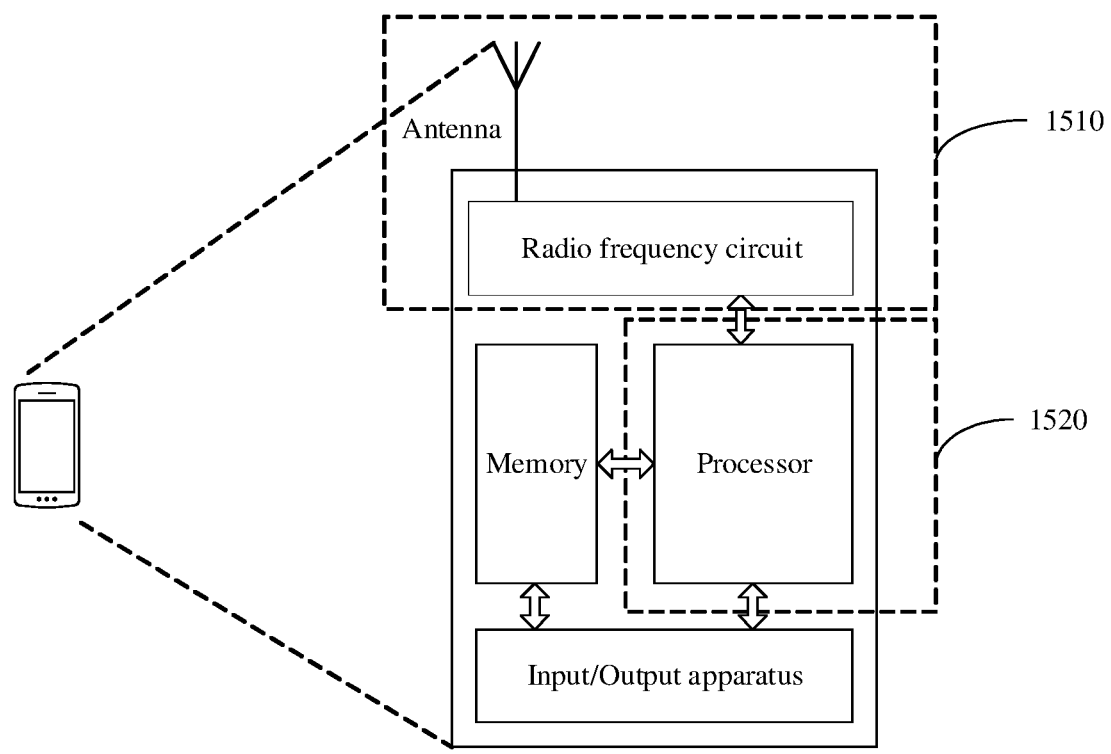
FIG. 15 is a schematic diagram of an apparatus for determining a status of an antenna panel according to another specific embodiment.

Optionally, when the apparatus in this embodiment is a terminal, FIG. 15 is a schematic diagram of a structure of a simplified terminal. For ease of understanding and convenience of figure illustration, an example in which the terminal is a mobile phone is used in FIG. 15. As shown in FIG. 15, the terminal includes a processor, a memory, a radio frequency circuit, an antenna, and an input/output apparatus. The processor is mainly configured to: process a communication protocol and communication data, control the terminal, execute a software program, process data of a software program, and so on. The memory is configured to store the software program and the data. A radio frequency circuit is mainly configured to: perform conversion between a baseband signal and a radio frequency signal, and process the radio frequency signal. The antenna is mainly configured to send and/or receive a radio frequency signal in a form of an electromagnetic wave. The input/output apparatus, for example, a touchscreen, a display screen, or a keyboard, is mainly configured to receive data input by a user, and output data to the user. It should be noted that some types of terminals may not have an input/output apparatus.

When the processor needs to send data, the processor performs baseband processing on the to-be-sent data, and outputs a baseband signal to the radio frequency circuit. After performing radio frequency processing on the baseband signal, the radio frequency circuit transmits a radio frequency signal in an electromagnetic wave form through the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 15 shows merely one memory and one processor. In an actual terminal product, there may be one or more processors and one or more memories. The memory may also be referred to as a storage medium, a storage device, or the like. The memory may be disposed independent of the processor, or may be integrated with the processor. This is not limited in the embodiments.

In this embodiment, the antenna and the radio frequency circuit that have sending and receiving functions may be considered as a transceiver unit of the terminal, and the processor that has a processing function may be considered as a processing unit of the terminal. As shown in FIG. 15, the terminal includes a transceiver unit 1510 and a processing unit 1520. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1510 and that is configured to implement a receiving function may be considered as a receiving unit, and a component that is in the transceiver unit 1510 and that is configured to implement a sending function may be considered as a sending unit. That is, the transceiver unit 1510 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiving circuit, or the like. The sending unit may also be sometimes referred to as a transmitter machine, a transmitter, a transmitter circuit, or the like.

It should be understood that the transceiver unit 1510 is configured to perform a sending operation and a receiving operation on a terminal side in the foregoing method embodiments, and the processing unit 1520 is configured to perform an operation other than the receiving/sending operation of the terminal in the foregoing method embodiments.

For example, in an implementation, the processing unit 1520 is configured to perform the processing step 303 on the terminal side. The transceiver unit 1510 is configured to perform the sending operation and the receiving operation in step 301 and/or step 304 in FIG. 3, and/or the transceiver unit 1510 is further configured to perform other sending and receiving steps on the terminal side in the embodiments. Alternatively, the processing unit 1520 is configured to perform the processing steps 601 and/or 602 on the terminal side. The transceiver unit 1510 is configured to perform the sending operation and the receiving operation in step 603 in FIG. 6, and/or the transceiver unit 1510 is further configured to perform other sending and receiving steps on the terminal side in the embodiments.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 16:
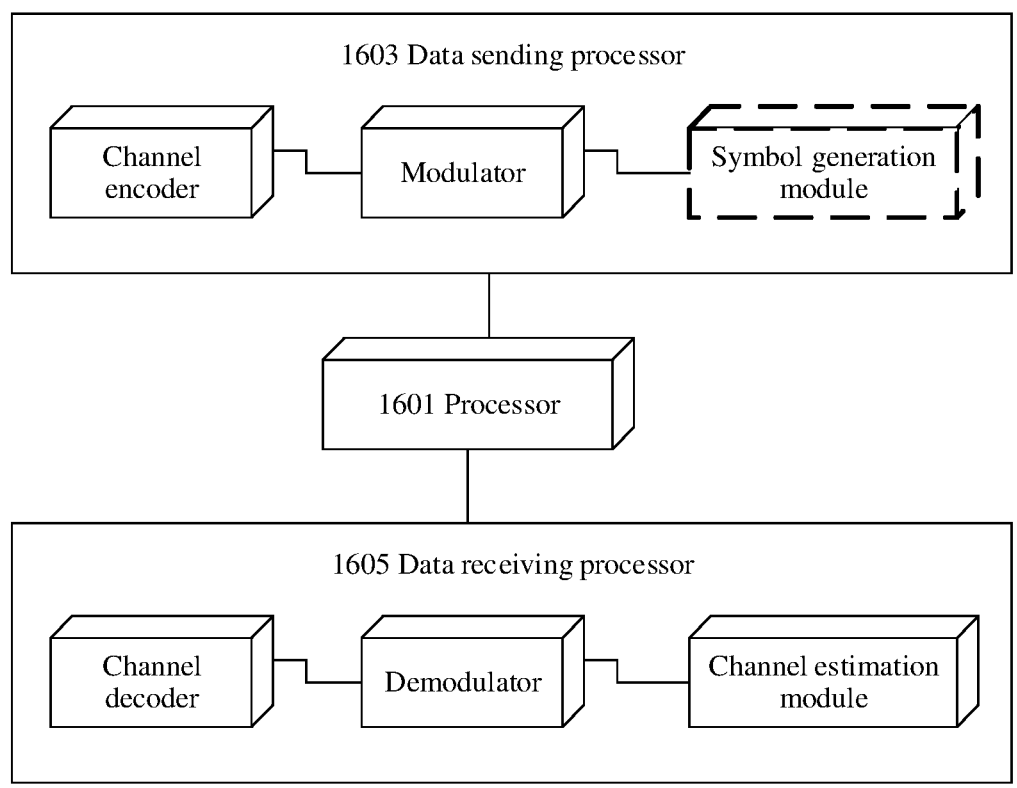
FIG. 16 is a schematic diagram of an apparatus for determining a status of an antenna panel according to another specific embodiment.

Optionally, when the apparatus is a terminal, further refer to the device shown in FIG. 16. In an example, the device may implement a function similar to a function of the processor 1510 in FIG. 15. In FIG. 16, the device includes a processor 1601, a data sending processor 1603, and a data receiving processor 1605. The processing module in the foregoing embodiment may be the processor 1601 in FIG. 16, and completes a corresponding function. The transceiver module 710 or the transceiver module 1110 in the foregoing embodiment may be the data receiving processor 1605 or the data sending processor 1603 in FIG. 16. Although FIG. 16 shows a channel encoder and a channel decoder, it may be understood that the modules are merely examples, and do not constitute a limitation on this embodiment.

Figure 17:
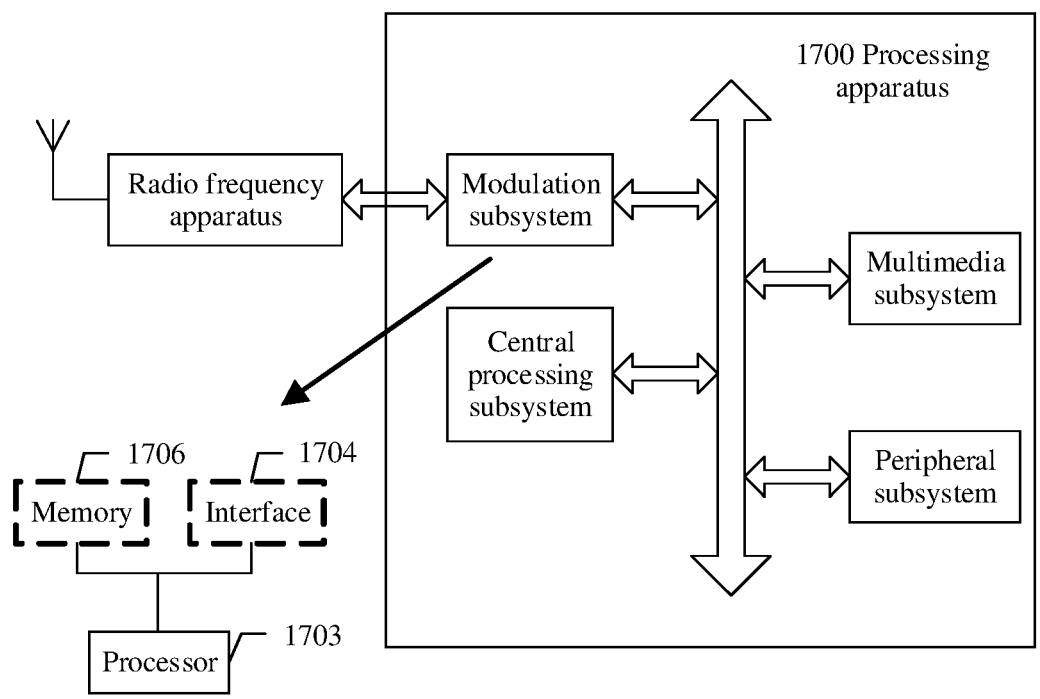
FIG. 17 is a schematic diagram of an apparatus for determining a status of an antenna panel according to another specific embodiment.

FIG. 17 shows another form of the terminal according to this embodiment. A processing apparatus 1700 includes modules such as a modulation subsystem, a central processing subsystem, and a peripheral subsystem. The communication device in this embodiment may be used as the modulation subsystem in the processing apparatus. For example, the modulation subsystem may include a processor 1703 and an interface 1704. The processor 1703 completes a function of the processing module 720 or the processing module 1120, and the interface 1704 completes a function of the transceiver module 710 or the transceiver module 1110. In another variant, the modulation subsystem includes a memory 1706, a processor 1703, and a program that is stored in the memory and that can be run on the processor. When executing the program, the processor implements the method according to one of the foregoing embodiments. It should be noted that the memory 1706 may be non-volatile, or may be volatile. The memory 1706 may be located in the modulation subsystem, or may be located in the processing apparatus 1700, as long as the memory 1706 can be connected to the processor 1703.

Figure 18:
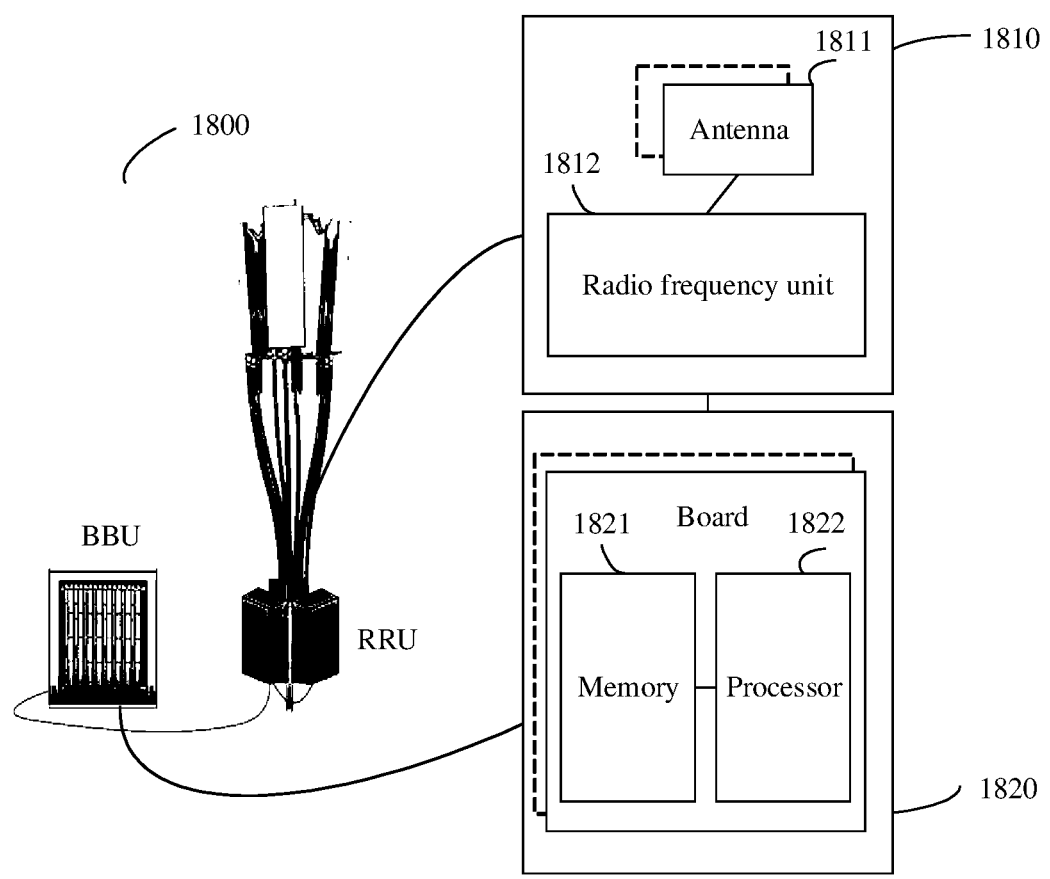
FIG. 18 is a schematic diagram of an apparatus for determining a status of an antenna panel according to another specific embodiment.

When the apparatus in this embodiment is an access network device, the access network device may be that shown in FIG. 18. The apparatus 1800 includes one or more radio frequency units, for example, a remote radio unit (RRU) 1810 and one or more BBUs (also referred to as digital units, digital units, DUs) 1820. The RRU 1810 may be referred to as a transceiver module, and corresponds to the receiving module and the sending module. Optionally, the transceiver module may also be referred to as a transceiver machine, a transceiver circuit, a transceiver, or the like, and may include at least one antenna 1811 and a radio frequency unit 1812. The RRU 1810 is mainly configured to: send and receive a radio frequency signal, and perform conversion between the radio frequency signal and a baseband signal. For example, the RRU 1810 is configured to send indication information to a terminal. The BBU 1810 is mainly configured to: perform baseband processing, control a base station, and so on. The RRU 1810 and the BBU 1820 may be physically disposed together, or may be physically separated, that is, in a distributed base station.

The BBU 1820 is a control center of the base station, and may also be referred to as a processing module. The BBU 1820 may correspond to the processing module 920 in FIG. 9, and is mainly configured to implement a baseband processing function such as channel coding, multiplexing, modulation, or spreading. For example, the BBU (the processing module) may be configured to control the base station to perform an operation procedure related to the access network device in the foregoing method embodiments, for example, generate the foregoing indication information.

In an example, the BBU 1820 may include one or more boards. A plurality of boards may jointly support a radio access network (for example, an LTE network) of a single access standard, or may separately support radio access networks (for example, an LTE network, a 5G network, and another network) of different access standards. The BBU 1820 further includes a memory 1821 and a processor 1822. The memory 1821 is configured to store necessary instructions and data. The processor 1822 is configured to control the base station to perform a necessary action, for example, configured to control the base station to perform an operation procedure related to the access network device in the foregoing method embodiments. The memory 1821 and the processor 1822 may serve one or more boards. In other words, the memory and the processor may be independently disposed on each board. Alternatively, the plurality of boards may share a same memory and processor. In addition, a necessary circuit may further be disposed on each board.

In addition, the access network device is not limited to the foregoing forms, and may also be in another form. For example, the access network device includes a BBU and an adaptive radio unit (ARU), or includes a BBU and an active antenna unit (AAU), or may be customer premises equipment (CPE), or may be in another form. This is not limited in the embodiments.

In another form of this embodiment, a computer-readable storage medium is provided. The computer-readable storage medium stores instructions. When the instructions are executed, the methods in the foregoing method embodiments are performed.

In another form of this embodiment, a computer program product including instructions is provided. When the instructions are executed, the methods in the foregoing method embodiments are performed.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer program instruction is loaded and executed on a computer, the procedure or functions according to the embodiments are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-dense digital video disc (DVD)), a semiconductor medium (for example, a solid-state drive (SSD)), or the like.

It should be understood that the processor may be an integrated circuit chip and has a signal processing capability. In an implementation process, the steps in the foregoing method embodiment may be completed by using a hardware integrated logic circuit in the processor or instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and logic block diagrams that are disclosed in the embodiments may be implemented or performed. The general-purpose processor may be a microprocessor, or the processor may be any conventional processor or the like. The steps of the methods disclosed with reference to the embodiments may be directly executed and accomplished by using a hardware decoding processor, or may be executed and accomplished by using a combination of hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments may be a volatile memory or a non-volatile memory, or may include both a volatile memory and a non-volatile memory. The non-volatile memory may be a ROM, a PROM, an EPROM, an EEPROM, or a flash memory. The volatile memory may be a RAM and is used as an external cache. By way of example but not limitative description, many forms of RAMs may be used, for example, a static random access memory (SRAM), a dynamic random access memory (DRAM), a synchronous dynamic random access memory (SDRAM), a double data rate-synchronous dynamic random access memory (DDR SDRAM), an enhanced synchronous dynamic random access memory (ESDRAM), a synchlink dynamic random access memory (SLDRAM), and a direct rambus random access memory (DR RAM).

In the embodiments, "at least one" means one or more, and "a plurality of" means two or more. The term "and/or" describes an association relationship between associated objects, and indicates that three relationships may exist. For example, A and/or B may indicate the following cases: A exists alone, both A and B exist, and B exists alone, where A and B may be singular or plural. The character "/" usually indicates an "or" relationship between the associated objects. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural.

It should be understood that "an embodiment" or "an embodiment" does not mean that particular features, structures, or characteristics related to the embodiment are included in at least one embodiment. Therefore, "in an embodiment" does not refer to a same embodiment. In addition, these particular features, structures, or characteristics may be combined in one or more embodiments in any appropriate manner. It should be understood that, in the embodiments, sequence numbers of the foregoing processes do not mean execution sequences. The execution sequences of the processes should be determined based on functions and internal logic of the processes, and should not constitute any limitation to implementation processes of the embodiments.

The terms such as "component", "module", and "system" are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in the figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by performing a local and/or remote process and based on, for example, a signal having one or more data packets (for example, data from two components interacting with another component in a local system, a distributed system, and/or across a network such as an internet interacting with another system by using the signal).

It should be further understood that "first", "second", and various numerical symbols are merely used for distinguishing for ease of description, and are not used to limit a scope of the embodiments.

It should be understood that, the term "and/or" describes only an association relationship for describing associated objects and represents that three relationships may exist. For example, A and/or B may represent the following three cases: Only A exists, both A and B exist, and only B exists. When only A or only B exists, a quantity of A or B is not limited. In an example in which only A exists, it may be understood as that there is one or more A.

A person of ordinary skill in the art may be aware that, with reference to the examples described in the embodiments, units and algorithm steps may be implemented by electronic hardware or a combination of computer software and electronic hardware. Whether the functions are performed by hardware or software depends on particular applications and design constraints of the solutions. A person of ordinary skill in the art may use different methods to implement the described functions for each particular application, but it should not be considered that the implementation goes beyond the scope of the embodiments.

A person of ordinary skill in the art may clearly understand that, for the purpose of convenient and brief description, for detailed working processes of the foregoing system, apparatuses, and units, refer to corresponding processes in the foregoing method embodiments. Details are not described herein again.

In the several embodiments provided, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units. For example, the components may be located at one position, or may be distributed on a plurality of network units. Some or all of the units may be selected depending on actual requirements to achieve the objectives of the solutions in the embodiments.

In addition, function units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the solutions of the embodiments essentially, or the part contributing to the conventional technology, or some of the solutions may be implemented in a form of a software product. The computer software product is stored in a storage medium, and includes several instructions for instructing a computer device (which may be a personal computer, a server, or a network device) to perform all or some of the steps of the methods described in the embodiments. The foregoing storage medium includes: any medium that can store program code, such as a USB flash drive, a removable hard disk, a ROM, a RAM, a magnetic disk, or an optical disc.

The foregoing descriptions are merely specific implementations of the embodiments, but the protection scope of the embodiments is not limited thereto. Any variation or replacement readily figured out by a person of ordinary skill in the art within the scope disclosed in the embodiments shall fall within the protection scope of the embodiments.

What is claimed is:

1. A method for determining a status of an antenna panel, comprising:
   receiving configuration information, wherein the configuration information comprises at least one downlink signal resource set; and
   sending first feedback information when a first antenna panel corresponding to a first downlink signal resource set in the at least one downlink signal resource set is turned on, wherein the first feedback information is used to indicate quality of a resource in the first downlink signal resource set, and the quality of the resource in the first downlink signal resource set is obtained by measuring a downlink signal by the first antenna panel; and
   sending second feedback information when a first antenna panel corresponding to the first downlink signal resource set in the at least one downlink signal resource set is turned off, wherein the second feedback information is used to indicate that the first antenna panel is turned off.

2. The method according to claim 1, wherein before the sending of first feedback information or second feedback information, the method further comprises:
   determining, based on a first mapping relationship and the first downlink signal resource set, the first antenna panel corresponding to the first downlink signal resource set, wherein the first mapping relationship is a mapping relationship between the at least one downlink signal resource set and at least one antenna panel.

3. The method according to claim 1, wherein before the sending of first feedback information or second feedback information, the method further comprises:
   determining, based on a second mapping relationship, a third mapping relationship, and the first downlink signal resource set, the first antenna panel corresponding to the first downlink signal resource set, wherein the second mapping relationship is a mapping relationship between at least one report configuration and the at least one downlink signal resource set, and the third mapping relationship is a mapping relationship between at least one report configuration and at least one antenna panel.

4. The method according to claim 1, wherein the second feedback information comprises at least one field; and when a value of the at least one field is a preset value, the value of the at least one field indicates that the first antenna panel is turned off.

5. A method for determining a status of an antenna panel, comprising:
   sending configuration information, wherein the configuration information comprises at least one downlink signal resource set;
   receiving first feedback information er and second feedback information, wherein the first feedback information is used to indicate quality of a resource in a first downlink signal resource set in the at least one downlink signal resource set, the quality of the resource in the first downlink signal resource set is obtained by a terminal by measuring a downlink signal when a first antenna panel corresponding to the first downlink signal resource set is turned on, and the second feedback information is used to indicate that the first antenna panel corresponding to the first downlink signal resource set in the at least one downlink signal resource set is turned off; and
   determining, based on the first feedback information er and the second feedback information, whether the first antenna panel is turned on or turned off.

6. The method according to claim 5, wherein the at least one downlink signal resource set has a first mapping relationship with at least one antenna panel, and the first antenna panel is an antenna panel that is in the at least one antenna panel and that corresponds to the first downlink signal resource set.

7. The method according to claim 5, wherein at least one report configuration has a second mapping relationship with the at least one downlink signal resource set, the at least one report configuration has a third mapping relationship with at least one antenna panel, the first antenna panel is an antenna panel that is in the at least one antenna panel and that corresponds to a first report configuration, and the first report configuration is a report configuration that is in the at least one report configuration and that corresponds to the first downlink signal resource set.

8. The method according to claim 5, wherein the second feedback information comprises at least one field; and when a value of the at least one field is a preset value, the value of the at least one field indicates that the first antenna panel is turned off.

9. A method for determining a status of an antenna panel, comprising:
   receiving first configuration information, wherein the first configuration information comprises at least one uplink signal resource set; and when a first antenna panel corresponding to a first uplink signal resource set in the at least one uplink signal resource set is turned on, sending a first reference signal by using the first antenna panel, wherein the first reference signal is a reference signal corresponding to a resource in the first uplink signal resource set; and when a first antenna panel corresponding to a first uplink signal resource set in the at least one uplink signal resource set is turned off, skipping sending a first reference signal, wherein the first reference signal is a reference signal corresponding to a resource in the first uplink signal resource set.

10. The method according to claim 9, wherein the at least one uplink signal resource set has a first mapping relationship with at least one antenna panel, and the first antenna panel is an antenna panel that is in the at least one antenna panel and that corresponds to the first uplink signal resource set.

11. The method according to claim 9, further comprising:
receiving second configuration information; and
adjusting a configuration parameter of the first antenna panel based on the second configuration information.

12. The method according to claim 11, wherein the second configuration information comprises a reconfigured configuration parameter, and the configuration parameter comprises at least one of a measurement report related configuration, a measurement resource related configuration, a transmission configuration indicator (TCI) status, a spatial relation, an uplink scheduling request (SR) resource, and a physical uplink control channel resource.

* * * * *

UNITED STATES PATENT AND TRADEMARK OFFICE
CERTIFICATE OF CORRECTION

PATENT NO. : 12,136,961 B2
APPLICATION NO. : 17/531054
DATED : November 5, 2024
INVENTOR(S) : Bo Fan et al.

Page 1 of 1

It is certified that error appears in the above-identified patent and that said Letters Patent is hereby corrected as shown below:

In the Claims

Column 44, Claim 5, Line 26, please remove "er".

Column 44, Claim 5, Line 39, please remove "er".

Signed and Sealed this
Twenty-eighth Day of January, 2025

Coke Morgan Stewart
*Acting Director of the United States Patent and Trademark Office*